US006927942B2

United States Patent
Tani et al.

(10) Patent No.: US 6,927,942 B2
(45) Date of Patent: Aug. 9, 2005

(54) MAGNETIC HEAD SLIDER AND MAGNETIC HEAD SLIDER ASSEMBLY HAVING A LEADING SLOPE ANGLE SMALLER THAN A TRAILING SLOPE ANGLE

(75) Inventors: Hiroshi Tani, Naka (JP); Mitsuhiro Shoda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 10/198,140

(22) Filed: Jul. 19, 2002

(65) Prior Publication Data

US 2003/0090833 A1 May 15, 2003

(30) Foreign Application Priority Data

Nov. 12, 2001 (JP) ........................................ 2001-346170

(51) Int. Cl.⁷ ................................................. G11B 5/60
(52) U.S. Cl. ................................ 360/235.6; 360/236.3; 360/237.1
(58) Field of Search ......................... 360/235.6, 236.3, 360/237.1, 234.6, 245, 245.1, 245.3, 245.4

(56) References Cited

U.S. PATENT DOCUMENTS

| | | | | |
|---|---|---|---|---|
| 5,418,667 A | * | 5/1995 | Best et al. ................... | 360/237 |
| 5,420,735 A | * | 5/1995 | Haines ...................... | 360/237.1 |
| 5,424,888 A | * | 6/1995 | Hendriks et al. ......... | 360/236.8 |
| 5,526,204 A | * | 6/1996 | French et al. ............. | 360/97.02 |
| 5,537,273 A | * | 7/1996 | Hendriks et al. ......... | 360/236.8 |
| 5,768,055 A | * | 6/1998 | Tian et al. ................. | 360/235.2 |
| 6,021,020 A | * | 2/2000 | Itoh et al. .................. | 360/236.1 |
| 6,191,923 B1 | * | 2/2001 | Tokuyama et al. ........ | 360/236.6 |
| 6,212,042 B1 | * | 4/2001 | Gui et al. .................. | 360/236.6 |
| 6,246,538 B1 | * | 6/2001 | Kasamatsu et al. ....... | 360/97.01 |
| 6,351,346 B2 | * | 2/2002 | Iwamoto ................... | 360/236.4 |
| 6,417,992 B2 | * | 7/2002 | Sugimoto et al. ......... | 360/236.2 |
| 6,424,493 B1 | * | 7/2002 | Matsumoto et al. ...... | 360/235.5 |
| 6,452,751 B1 | * | 9/2002 | Tokuyama et al. ........ | 360/236.6 |
| 6,493,188 B1 | * | 12/2002 | Tokisue et al. ............ | 360/245.1 |
| 6,633,455 B2 | * | 10/2003 | Tokisue et al. ............ | 360/236.3 |
| 6,657,819 B2 | * | 12/2003 | Ishihara ..................... | 360/235.7 |
| 6,657,820 B2 | * | 12/2003 | Kohira et al. ............. | 360/236.3 |

FOREIGN PATENT DOCUMENTS

| | | |
|---|---|---|
| JP | 6-119736 | 4/1994 |
| JP | 6-203514 | 7/1994 |
| JP | 8-102164 | 4/1996 |
| JP | 9-245451 | 9/1997 |
| JP | 10-49850 | 2/1998 |
| JP | 10-112023 | 4/1998 |
| JP | 11-25629 | 1/1999 |
| JP | 11-37748 | 2/1999 |
| JP | 11-185418 | 7/1999 |
| JP | 2000-55883 | 2/2000 |

* cited by examiner

*Primary Examiner*—Jefferson Evans
(74) *Attorney, Agent, or Firm*—Mattingly, Stanger, Malur & Brundidge, P.C.

(57) ABSTRACT

A head slider has small friction force even if the head slider comes in contact with a magnetic disk having a smooth surface at high speed. The vibration is also low and wear resistance is high. The head slider is provided with plural air bearing surfaces for floating over the magnetic disk or one or more lubricant bearing surfaces for smoothly gliding over the magnetic disk. A slope angle on the front side of the bearing surface in the traveling direction of the head slider is larger than a slope angle on the rear side of the bearing surface in the vicinity of a contact part of the bearing surface that may come in contact with the magnetic disk.

10 Claims, 15 Drawing Sheets

MAGNETIC HEAD SLIDER AND MAGNETIC HEAD SLIDER ASSEMBLY HAVING A LEADING SLOPE ANGLE SMALLER THAN A TRAILING SLOPE ANGLE

BACKGROUND OF THE INVENTION

1. Field of the Invention

The present invention relates to the shape of a magnetic head slider which is suitable for a magnetic disk having a smooth surface and has the extremely low flying height of 20 nm or less, particularly relates to a head slider used in a state in which the head slider is normally or intermittently in contact with a magnetic disk and particularly relates to a magnetic head slider the friction force and vibration in contact of which are reduced and a magnetic head slider assembly using it.

2. Description of the Related Art

The recording density of a magnetic disk apparatus is remarkably increasing and recently, a magnetic disk apparatus having the recording density of 10 Gbits or more per 1 $in^2$ is published. To achieve such high recording density, it is essential to put a magnetic head close to a magnetic recording layer of a magnetic disk and currently, an interval between them is 20 nm or less.

In a recent magnetic disk apparatus, to narrow the interval possibly, the surface roughness of a magnetic disk is required to be reduced possibly. As a result, in place of a conventional type contact start-stop system that when the rotation of the magnetic disk is stopped, a magnetic head comes in contact with the magnetic disk and when the magnetic disk starts to be rotated, the magnetic head floats by its airflow, a loading-unloading system that when the magnetic disk is stopped, the magnetic head retreats (is unloaded) from over the magnetic disk and when the magnetic disk starts to be rotated, the magnetic head is loaded over the magnetic disk is being adopted. In this case, the wear resistance is slightly enhanced, however, the magnetic disk is required to bear with mechanical shock in loading and the contact of the magnetic head due to the abnormality of the posture which may suddenly occur even in normal operation. As currently flying height is remarkably small, large friction force is made and a head slider largely vibrates when the magnetic disk having a smooth surface and the head slider come in contact and read/write may be disabled.

A magnetic disk is formed by sequentially laminating an underlayer, a magnetic layer, a protective layer and a lubricant layer on a non-magnetic substrate such as an aluminum alloy substrate and a glass substrate. For the surface roughness of the current magnetic disk, it is general that averaged center line roughness Ra on a data surface is approximately 0.5 to 2.5 nm. For the material of a lubricant layer, it is general that liquid lubricant made of perfluoropolyether is used and it is general that the thickness is 1.0 to 3.0 nm.

A burnishing head is used in a process for removing a projection called a burnishing process or a process for cleaning in a final process for manufacturing a magnetic disk as disclosed in Japanese published unexamined patent application No. Hei10-112023. In the patent application, technique for avoiding adhesion by roughing the surface roughness of the burnishing head because the burnishing head adheres to the magnetic disk and the effect of removing a projection and dirt cannot be fulfilled in case the surface roughness of the magnetic disk is small is disclosed.

A glide head is used in a projection detecting inspection process for attaching a piezoelectric element to the back of a head slider and detecting that the projection of a magnetic disk comes in contact as disclosed in Japanese published unexamined patent application No. Hei11-37748. The flying height of the glide head is currently 10 nm or less and when the glide head comes in contact with the magnetic disk, large friction force is made and the glide head may scratch or strike the magnetic disk.

A head for an error check is a head for checking a detect of a read/write signal from/onto a magnetic disk as disclosed in Japanese published unexamined patent application No. 2000-55883 and a read/write element is mounted in the vicinity of the air trailing edge of a head slider. A process for assembling a magnetic disk apparatus includes a servo track recording process which is a process for writing a servo signal onto the magnetic disk and a head called a clock head for writing a reference signal onto the magnetic disk is used at that time. The clock head often writes a clock signal in the vicinity of the outer edge of the magnetic disk, in the process, the head and the disk come in contact and in case the magnetic disk is flat, normal recording may be disabled or the disk may be damaged.

In the contact start-stop system, the smaller the surface roughness of a magnetic disk is and the flatter the surface of the magnetic disk is, the more stiction becomes and the stiction hinders the starting of a magnetic disk apparatus. Then, in Japanese published unexamined patent application No. Hei6-203514, technique for reducing stiction by providing a stepped projection to the surface of an air bearing of a slider is disclosed. This well-known patent application shows that area in which a magnetic disk and the slider are in contact is reduced by setting the height of the stepped projection so that the value is larger than 0.01 $\mu$m and is smaller than 1.5 $\mu$m and the stability of the flying slider and the reduction of stiction are enabled by reducing the contact area. However, in the patent application, it is not disclosed whether there is the effect of reducing friction in case the head comes in contact with the magnetic disk at high speed or not.

In Japanese published unexamined patent application No. Hei11-25629, a head slider provided with the similar stepped projection to that in the well-known patent application the slope angle of the surface of an air bearing of which with a recording surface of a magnetic disk, that is, the pitch angle of which is 0.5 to 1.5 mrad is disclosed. In this well-known patent application, the contact area of the head slider and a magnetic disk is reduced by using the magnetic disk the averaged center line roughness Ra of which is 1 nm or less and adjusting the height of the stepped projection so that the pitch angle has the value described above and as a result, stiction is reduced. In the well-known patent application, technique for reducing friction in contact at high speed is also not disclosed.

In Japanese published unexamined patent application No. Hei9-245451, technique for reducing the contact area of a magnetic disk and a head slider in a state in which a projection is formed on the surface of an air bearing of the slider and the magnetic disk is static and avoiding adhesion as a result is disclosed. In this well-known patent application, it is shown that the smaller the surface roughness of the magnetic disk is, the smaller the area of the projection on the surface of the slider is required to be. In Japanese published unexamined patent application No. Hei8-102164, technique for reducing the contact area of a slider and a magnetic disk by forming difference-in-stage made of a thin film in a part of the surface of the slider and reducing static friction is similarly disclosed. However, technique for reducing friction in contact at high speed is also not disclosed in these well-known patent applications.

In Japanese published unexamined patent applications No. Hei10-49850 and No. Hei11-185418, for a method of reducing difference between flying height in the position of a read/write element and flying height at an air trailing edge in a slider provided with difference-in-stage in the vicinity of an air leading edge of the slider, a method of controlling an angle between the surface of an air bearing and the surface of a magnetic disk and reducing distance from the element to the lowest point of the air trailing edge by tapering a part at the air trailing edge is disclosed. For a well-known patent application related to a suspension of a slider, there is also Japanese published unexamined patent application No. Hei6-119736. This well-known patent application discloses a suspension provided with two movable parts of the side of a base plate for fixing the suspension and a part bonded to the slider to reduce the out-of-plane stiffness of a head and reduce the dispersion of a load onto the slider. However, in these patent applications, technique for reducing friction in contact at high speed is also not disclosed.

SUMMARY OF THE INVENTION

In the prior art, the flying height of the head is remarkably reduced and in the meantime, friction force between the head slider and the magnetic disk made in contact at high speed in case the head intermittently or continuously comes in contact with the magnetic disk is not reduced.

That is, in the case of the burnishing head, it is desirable to work so that the projection of the magnetic disk is lowered that the head passes over the projection, floating low as possible, however, then, the burnishing head is vibrated when it comes in contact with the magnetic disk, damages the magnetic disk and the ratio of acceptance in afterward glide inspection and error check is deteriorated.

Similarly in the cases of the glide head and the head for checking an error, to check the defect of the projection, inspection and a check at lower flying height than a magnetic head used in a magnetic disk apparatus are required and therefore, a probability in which the heads come in contact with a magnetic disk increases. In case the heads come in contact, they are vibrated and damage the magnetic disk. Therefore, when the flying height of the slider is reduced up to 10 nm or less in projection defect inspection and an error check, the magnetic disk may be damaged in the manufacture, may be built in the magnetic disk apparatus in a state in which the magnetic disk has a projection and an error may occur in the part while the magnetic disk is operated. After a magnetic disk apparatus is assembled, an error and thermal asperity are registered, however, at that time, when there are many projections on a magnetic disk, there is a problem that the number of errors exceeds a predetermined number and it takes a long time to resister them.

The clock head also has problems that when the head comes in contact, it damages a magnetic disk, as a head of a magnetic disk apparatus passes over the damage in the case of the magnetic disk apparatus according to the loading-unloading system even if a clock recorded position is outside a data area, the damage is further widened and further, when the head is damaged, the reliability of the magnetic disk apparatus is deteriorated. For a concrete example, a problem that as the apparatus is operated, errors increase and recorded data is lost occurs. In case the magnetic disk and any head come in contact at high speed, a head slider and a slider suspension which can reduce friction force in contact made particularly in the case of a flat magnetic disk are required to be provided.

A head slider used in a magnetic disk apparatus may damage a magnetic disk in case lubricant on the magnetic disk is removed when the head slider comes in contact with the magnetic disk and in case normal read/write is disabled because the head is greatly vibrated and leaps.

The object of the invention in consideration of the above is to provide a head slider which causes no large friction force when the head slider comes in contact with a magnetic disk being operated at high speed and having a smooth surface and the head of which is not vibrated, a head slider assembly, a method of inspecting and manufacturing a magnetic disk using these and a magnetic servo recording method.

In a magnetic disk apparatus that reads and writes in continuous contact at high speed, a head slider and a slider suspension the vibration by friction at high speed of which is small are required and it is an more important object to provide them. In the prior art, problems that when the head slider and the magnetic disk come in contact and large friction force is made, the magnetic disk is damaged and errors increase, that is, recorded signals are lost as the magnetic disk apparatus is operated occur. Further, in the prior art, stiction is reduced by forming difference-in-stage or a projection on the bearing surface of the slider and reducing contact area with the magnetic disk, however, in that case, as contact surface pressure increases when the slider comes in contact at high speed in a state in which the contact area is small, the head or the magnetic disk is easily worn and the reliability is deteriorated.

In the meantime, another object of the invention is to provide means for increasing contact area, reducing contact surface pressure and also reducing friction in contact at high speed with a magnetic disk and a magnetic disk apparatus using the means.

To achieve the objects, the invention is based upon a head slider provided with plural air bearing surfaces for floating over a magnetic disk platter or plural lubricant bearing surfaces for smoothly gliding over the magnetic disk platter, coming in contact and a loading point or a pivot point that receives a load onto the rotated magnetic disk, and is characterized in that a leading slope angle (pitch angle) from the closest end or the closest contact part to the magnetic disk platter of the bearing surface in front of the loading point in the traveling direction of the slider with the surface of the magnetic disk is smaller than a trailing slope angle from the closest end or the closest contact part with the surface of the magnetic disk and at least a part of the width in a lateral direction for the traveling direction of the head slider of each bearing surface is 150 $\mu$m or more.

The head slider is characterized in that the leading slope angle (pitch angle) in the traveling direction of the slider from the closest end or the closest contact part to the magnetic disk platter of the bearing surface with the surface of the magnetic disk is 20 to 150 $\mu$rad.

Further, the head slider is characterized in that at least one of the bearing surfaces is not located on the same plane, difference-in-stage is formed on the bearing surface in the vicinity of the leading edge located in front of the head loading point (pivot point) in the traveling direction of the slider and a slope angle (a pitch angle) determined by the difference-in-stage of the bearing surface with the surface of the magnetic disk is 20 to 150 $\mu$rad.

The head slider is also characterized in that a slope angle (a pitch angle) in the traveling direction of the head slider determined by difference-in-stage formed on the bearing surface in the vicinity of an air leading edge located in front of the loading point (the pivot point) in the traveling direction of the slider of the bearing surface with the surface of the magnetic disk is larger than a slope angle (a pitch angle) in the traveling direction of the head slider determined by the bearing in the vicinity of an air trailing edge located at the back of the loading point and the surface of the magnetic disk.

Furthermore, the head slider is characterized in that the bearing surface of the slider is made convex on the side of the magnetic disk platter in the vicinity of the center in the longitudinal direction of the slider and a slope angle (a pitch angle) determined by difference-in-stage on the bearing surface in the vicinity of the air trailing edge and the surface of the magnetic disk is 20 to 100 μrad.

Further, the invention is characterized in that bearing surfaces of the head slider are located on the same plane, each bearing surface is provided with a trench formed in a direction perpendicular to both the traveling direction of the slider and the magnetic disk platter, each trench has a slope angle with the magnetic disk platter and is formed in each depth and texture where the trench the slope angle of which is small is arranged in front on each bearing surface and the trench the slope angle of which is large is arranged in the rear adjacently or via a contact part is formed.

A magnetic disk apparatus including a magnetic recording medium on which information is recorded and a head slider provided with a magnetic head that reads and writes information from/to the magnetic recording medium is characterized in that the averaged center line roughness Ra of a magnetic disk mounted as the magnetic recording medium is 1.3 nm or less, the surface tension of lubricant with which the magnetic disk is provided is $20 \times 10^{-3}$ N/m (20 dyn/cm) or more, the thickness of the lubricant layer is 1.0 nm or more and further, the head slider is the head slider described above.

Further, a slider suspension for attaching the head slider is characterized in that one deformable part is provided between a rotation supporting mechanism of a slider supporting part and a suspension bending part in the vicinity of a suspension arm and the stiffness coefficient in a direction of the slider of the deformable part is smaller than the total rotational stiffness coefficient in a direction of pitch of the slider of the rotation supporting mechanism and a suspension stiff part on the side of the slider.

The invention is also characterized in that the head slider or a head slider assembly is used in at least any of a burnishing process, a glide inspection process and an error check process of a magnetic disk.

Furthermore, the invention is characterized in that the head slider or the head slider assembly is used in a servo track recording process.

DETAILED DESCRIPTION OF THE PREFERRED EMBODIMENTS

Figure 1:
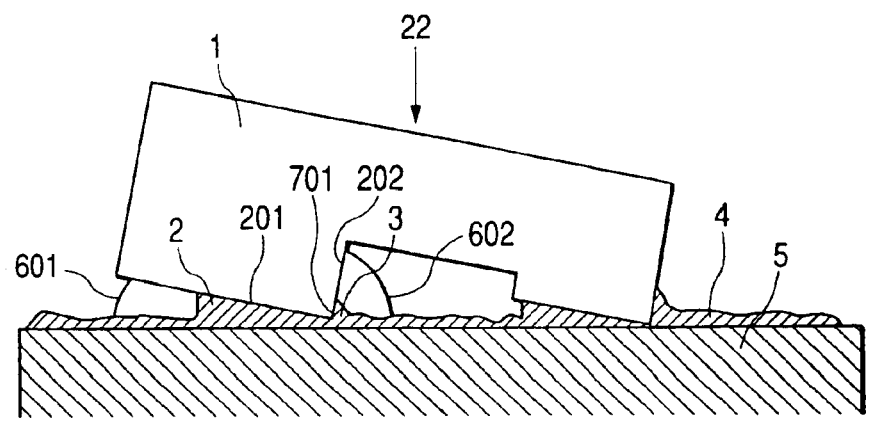
FIG. 1 is a schematic drawing showing the action of the invention.

Referring to the drawings, embodiments of the invention will be described below.

First Embodiment

Figure 2:
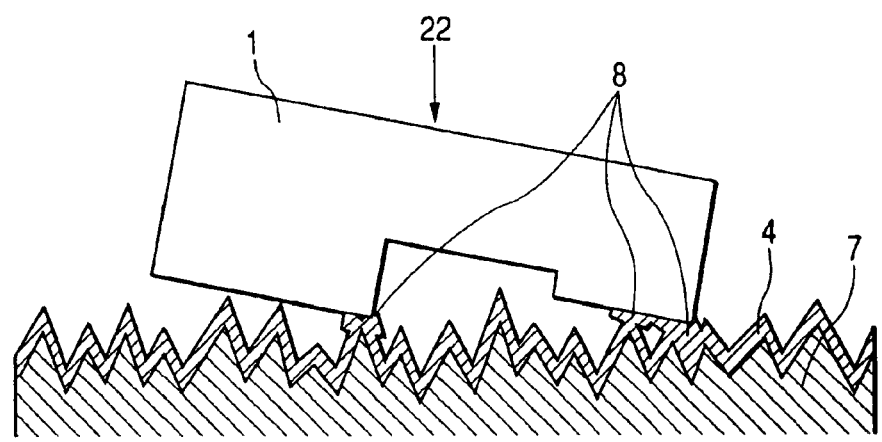
FIG. 2 is a schematic drawing for explaining prior art.
Figure 3:
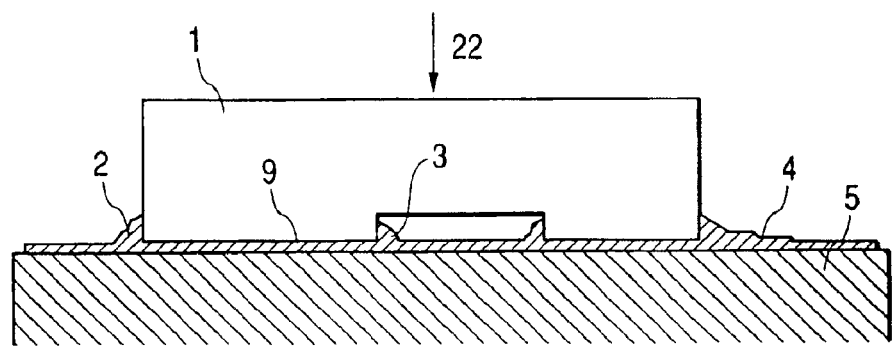
FIG. 3 is a schematic drawing for explaining the prior art.

Referring to FIGS. 1 to 3, the manufacture of a head slider based upon a head slider provided with plural air bearing surfaces for floating over a magnetic disk or plural lubricant bearing surfaces for smoothly gliding over the magnetic disk, coming in contact and characterized in that in the vicinity of a contact part of a bearing surface which may come in contact with the magnetic disk, the compression pressure of lubricant caused on the forward side in the traveling direction of the head slider is larger than the compression pressure caused on the backward side and in high-speed rotation, the head slider also stably glides over a smooth magnetic disk platter, flowing extremely low or via a lubricant layer will be concretely described below.

In the following embodiments, the traveling direction of a magnetic head slider over the surface of a rotated magnetic disk is described as forward and the direction of regression is described as backward.

FIG. 1 shows a case that a head slider 1 comes in contact with a smooth magnetic disk 5 having a lubricant layer 4. A leading slope angle 601 of a slider bearing surface 201 in front of a loading point (a pivot point) 22 of the slider (the traveling direction of the head slider) from the closest end (contact part) 701 to the magnetic disk platter is set so that the leading slope angle is smaller than a trailing slope angle 602 from the closest end (contact part) 701, that is, than a slope angle 602 of the trailing edge surface 202 of the slider bearing surface 201. A relatively large quantity of lubricant standing 2 exists in front of the closest end (contact point) 701 and trailing lubricant standing 3 is less than the leading standing 2.

Figure 4:
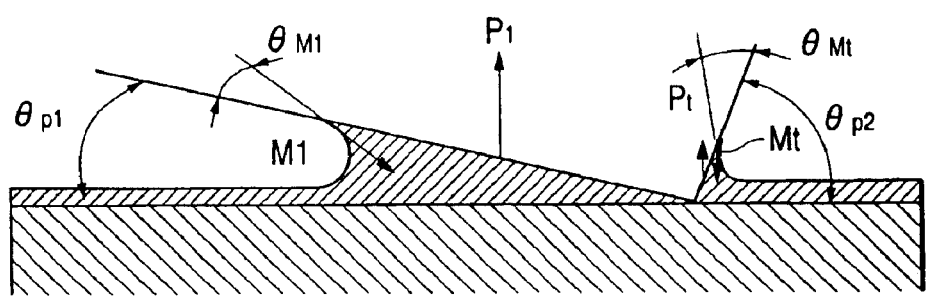
FIG. 4 is a schematic drawing for explaining the invention.

Force in this vicinity that acts on the head slider will be further detailedly described below. FIG. 4 enlarges the vicinity of the closest end (contact point) to the magnetic disk platter of the slider shown in FIG. 1. Referring to FIG. 4, force between lubricant and the head slider can be estimated as follows based upon the shape of lubricant in the vicinity of a contact point at which the smooth platter and the head slider are in contact at a pitch angle $\theta p1$ (equivalent to the slope angle 601 shown in FIG. 1) and at a pitch angle $\theta p2$ (equivalent to the slope angle 602 shown in FIG. 1).

That is, a meniscus is formed between the lubricant 2 standing in front and the head, and the head is attracted on the side of the magnetic disk by the force M1 of the meniscus. As the head tries to get on the lubricant standing 2 in front of the contact point, the lubricant is compressed and the head slider is vertically pushed up in a direction in which the head slider separates from the magnetic disk by compressive stress $P_1$. Trailing lubricant is similar, and the force Mt of a meniscus and compressive stress $P_t$ are generated. When angles between the lubricant and the bearing surface of the head are $\theta_{M1}$ and $\theta_{Mt}$, each force of the leading and trailing meniscuses is in proportion to COS ($\theta_{M1}$) and COS ($\theta_{Mt}$) and is in proportion to the surface tension of the lubricant. When the quantity of lubricant which is in contact with the slider is increased, the force of a meniscus increases.

In the meantime, as shown in FIG. 3, when the pitch angles $\theta p1$ and $\theta p2$ of the slider are reduced and the surface of the slider and the surface of the disk approach a surface roughness level of the magnetic disk, meniscuses are generated in front and at the back of a contact surface, however, as lubricant does not enter under the contact surface, it is not compressed and no compressive stress is applied to the slider. As the force of the leading meniscus is large, the contact surface is attracted toward the magnetic disk on the forward side in the traveling direction and lubricant enters under the contact surface less and less.

In case the pitch angle $\theta p1$ of the slider is large enough, that is, in case the quantity of the leading and trailing lubricant standings is substantially equal (in case the pitch angle 601 is larger in FIG. 1), it is estimated that the force of the meniscus and the compressive stress of the lubricant decrease when it is considered that the quantity of the leading lubricant standing is little and the compressive stress P1 is in proportion to COS $\theta p1$. That is, both in case the pitch angle $\theta p1$ is too large and too small, the compressive stress of the lubricant decreases and the head slider hardly separates from the magnetic disk. However, in case the pitch angle $\theta p1$ has a suitable value, the vertical width in the traveling direction of the contact point is increased and a load onto the head has an optimum value, the force of the meniscus, the compressive stress of the lubricant and the load onto the slider can be balanced, as the head slider floats on the lubricant layer, the solid contact of the slider and the magnetic disk can be avoided and the effect of reducing friction force which is a proper function of the lubricant layer can be fulfilled. That is, as friction force made in high-speed contact can be reduced by optimizing the pitch angle $\theta p1$ and no solid contact is caused, the head slider and the magnetic disk respectively extremely excellent in wear resistance can be combined. This thought is reverse to the method of reducing contact area and reducing stiction which is the prior art and friction force can be reduced by increasing contact area between the lubricant layer and the bearing surface of the slider and increasing the compressive stress of the leading lubricant layer.

For the slope angle (pitch angle) in front of the loading point, a suitable range is 20 to 150 $\mu$rad. For the vertical width in the traveling direction of each bearing, 150 $\mu$m or more is required for stable floating and stable glide.

In case a magnetic disk 7 not smooth and the head slider 1 come in contact as shown in FIG. 2, lubricant standing is dispersed at contact points 8, difference in quantity between leading and trailing lubricant standings from the contact point is little and the effect of the invention is not apparent.

Second Embodiment

Figure 5:
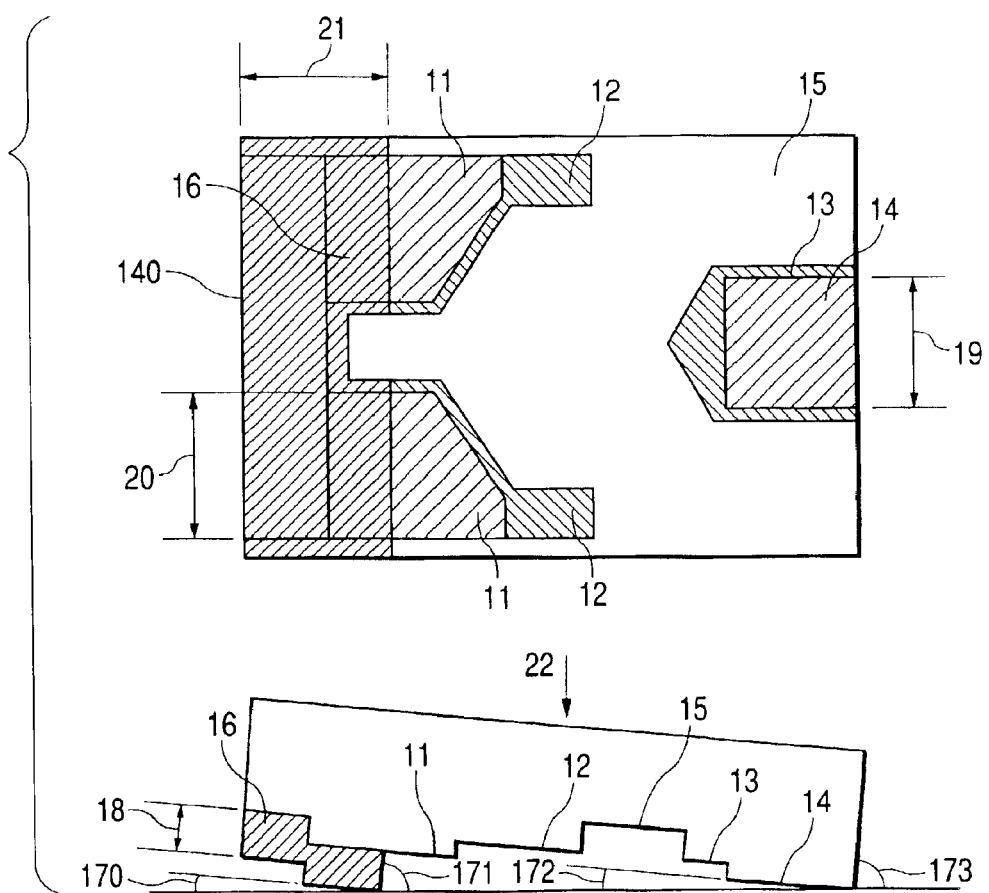
FIG. 5 is a schematic drawing showing a seventh embodiment of the invention.

FIG. 5 shows the outline of another embodiment of the concrete shape of a head slider.

A schematic plan showing the surface opposite to a magnetic disk of the slider is shown in an upper part of FIG. 5 and a schematic side view in case the head slider is static over the magnetic disk is shown in a lower part. Three bearing surfaces (11, 11, 14) are formed on the slider. Next, shallow trench surfaces 12, 13 and a deep trench surface 15 respectively for controlling negative pressure are formed. Further, difference-in-stage 16 is formed on the bearing surface off the leading edge 140 of the slider by length 21 and the height of the difference-in-stage is 18. In this case, a pitch angle 170 between the bearing surface of the slider and the magnetic disk is determined by the difference-in-stage 16. A loading point 22 of the slider is formed between the leading bearing surface 11 and the trailing bearing surface 14. Each width 20, 19 of the bearing surfaces is 150 $\mu$m or more and this width is equivalent to contact width between the bearing surface and the magnetic disk. As described above, the difference-in-stage is formed on the bearing surface in the vicinity of the leading edge of the head slider and each pitch angle 170 of the respective bearing surfaces of the head slider determined by the difference-in-stage is adjusted so that it is 20 to 150 $\mu$rad. The number of the bearing surfaces can be further increased. In FIG. 5, the difference-in-stage continuously exists from the leading edge, however, it is not necessarily required that the difference-in-stage is continuous.

Third Embodiment

Figure 6:
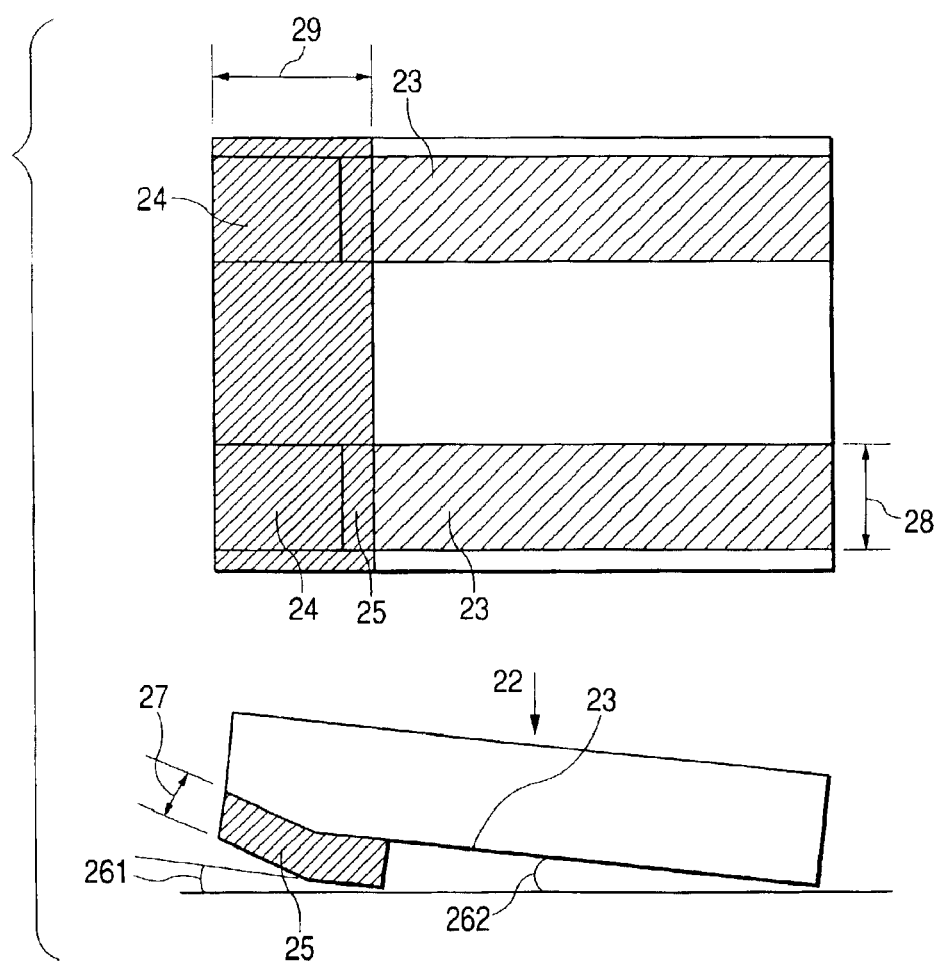
FIG. 6 is a schematic drawing showing an eighth embodiment of the invention.

FIG. 6 shows a head slider provided with two bearing surfaces as further another embodiment of the concrete shape of the head slider.

As shown in FIG. 6, a bearing surface 23 is tapered 24 in the vicinity of a leading edge and is continuously formed from the leading edge to a trailing edge. Difference-in-stage 25 is formed in a region off the leading edge by length 29 on the bearing surface. A pitch angle 261 is determined by the surface of the difference-in-stage-formed on the bearing surface 23 by length 27. The flying height is determined by the width 28 of the slider, the quantity of the taper 24 and a load 22 onto the head. A slider that continuously comes in contact is not particularly required to be tapered.

Figure 7:
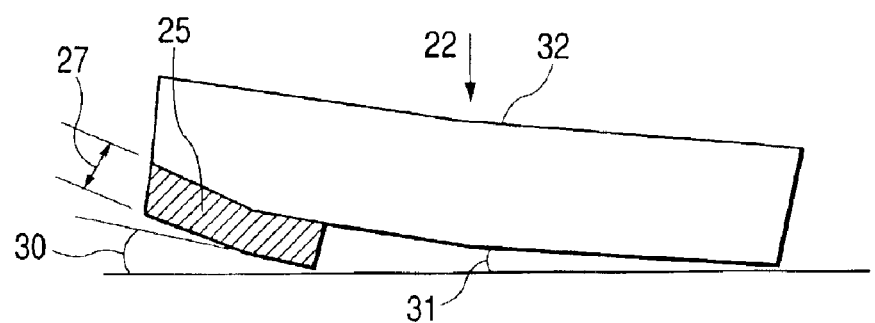
FIG. 7 is a schematic drawing showing a thirteenth embodiment of the invention.

A read/write element arranged in the vicinity of the trailing edge and the magnetic disk can be put closer by setting the pitch angle (the slope angle) 261 determined by an angle between the surface of the difference-in-stage formed on the bearing surface in the vicinity of the leading edge and the surface of the magnetic disk so that the pitch angle is larger than a pitch angle (a slope angle) 262 determined by the bearing surface in the vicinity of the trailing edge and the surface of the magnetic disk. Concretely, the approach described above is achieved by working the slider so that the side of the bearing surface of the slider is convex in a direction opposite to the magnetic disk in the vicinity of the center in the longitudinal direction of the slider or from the bearing surface in the vicinity of the leading edge to the read/write element in the vicinity of the trailing edge and setting the pitch angle determined by the bearing surface in the vicinity of the trailing edge and the surface of the magnetic disk so that the pitch angle is 20 to 100 μrad. The working is easy in case working which has performed as crowning is used and for example, the back of the head slider can be scribed by a laser beam. Referring to a conceptual drawing shown in FIG. 7, the shape in this embodiment will be further described below.

Difference-in-stage 25 is formed in the vicinity of the leading edge of the slider and a pitch angle 30 in a part having the difference-in-stage and a pitch angle 31 with the bearing surface on the side of the trailing edge are determined by height 27 and a crown 32 in the vicinity of the center of the slider. An interval between the read/write element in the vicinity of the trailing edge and the magnetic disk can be easily reduced by forming such a slider.

In case the difference-in-stage formed on the bearing surface is made of a carbon layer which has used for a protective layer for the slider, it is preferable in view of wear resistance.

Fourth Embodiment

Figure 8:
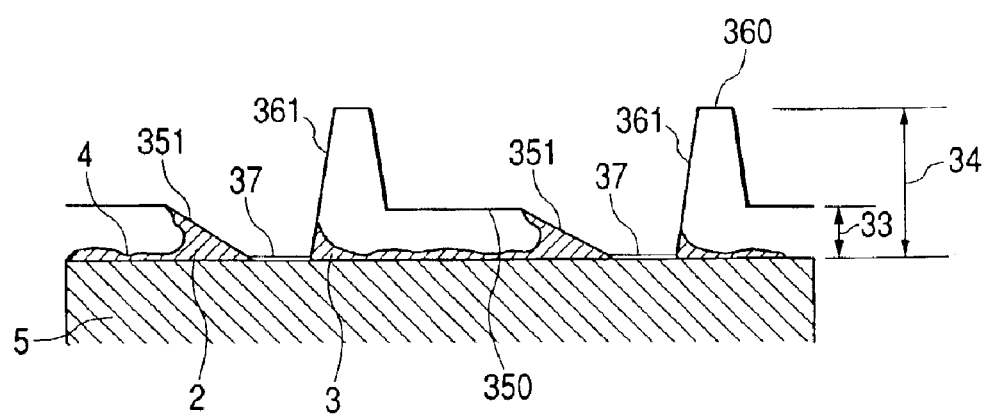
FIG. 8 is a schematic drawing for explaining the invention.
Figure 9:
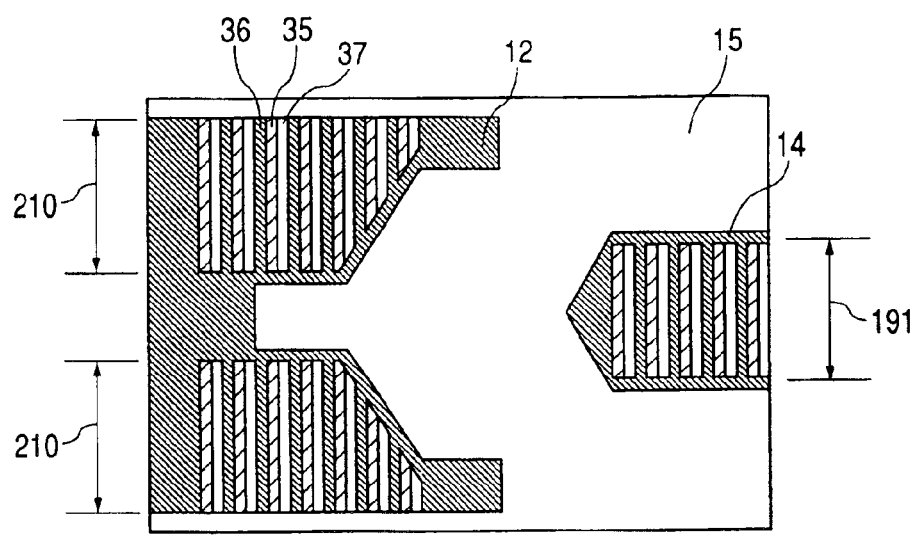
FIG. 9 is a schematic drawing showing a fourteenth embodiment of the invention.

For a method of controlling the compressive stress of lubricant on a head slider according to the invention, there is not a method of providing difference-in-stage to the vicinity of a leading edge but another method of forming texture trenches the slope angle of which is different on a bearing surface. Etching is used to form the texture trenches. In etching the head slider, when the head slider is etched deeply, an angle of a slope of the etched trench is large and when the head slider is etched shallowly, the angle of the slope of the etched trench is small. Or the angle of the slope of the etched trench can be also varied by changing an etching condition. Then, in case bearing surfaces are arranged on the same plane, a texture trench having a small slope angle is formed on each bearing surface in front vertically in the traveling direction of the slider, a texture trench having a large slope angle is formed adjacently at the back of each texture trench described above and texture trenches are composed by the combination of these texture trenches, relation according to the invention between slope angles (pitch angles) on each bearing surface of the slider can be acquired. Referring to FIGS. 8 and 9, a concrete example of the magnetic head slider according to this method will be described below.

FIG. 8 is a schematic sectional view showing a state in which the bearing surface of the slider the shape including a shallow texture trench on the left side, a contact surface adjacent to it and a deep texture trench of which is repeatedly formed and the magnetic disk are in contact. The angle of the slope 351 of the shallow texture trench 35 having the bottom 350 is small and the angle of the slope 361 of the deep texture trench 36 having the bottom 360 is large. These texture trenches are formed by selecting an etching condition. In this structure, as the angle of the slope on the side of the shallow texture trench is small, much lubricant 2 accumulates and conversely, less lubricant 3 accumulates on the slope on the side of the deep texture trench. FIG. 9 shows the outline of the plane opposite to the magnetic disk of the actual slider and the texture trenches having the shape shown in FIG. 8 are formed on the bearing surface.

For the head slider according to the invention, it is desirable to increase the compressive stress of lubricant that the width (the texture width 210 of an air leading bearing surface and the texture width 191 of an air trailing bearing surface respectively shown in FIG. 9) of each bearing surface is large. It is also desirable that the sum in the shorter direction of the width of bearing surfaces located in substantially the same position between the leading edge of the head slider and the trailing edge is 300 μm or more and it is suitable that the width of each bearing surface is 150 μm or more. In application, the flying height in design of the head slider is to be considered under the above condition and a head slider the contact friction force of which is reduced by the effect of the invention can be acquired by designing the width, the length and the number of bearing surfaces.

As the effect is reduced when the surface roughness of the magnetic disk opposite to the head slider according to the invention is large as shown in FIG. 2, it is desirable that the head slider is combined with a magnetic disk the averaged center line roughness Ra of which is 1.3 nm or less. Further, the invention is also greatly related to the characteristics of lubricant for a magnetic disk. Then, lubricant in which a meniscus is easily formed and the compressive stress of which is large is desirable. Actually, perfluoropolyether which is lubricant, which is manufactured by Ausimont and the surface tension at 20° C. of which is 20 to 30 mN/m such as Fomblin Z-DOL, Fomblin Z-DOLTX and Fomblin tetraol can be used. As the surface tension of lubricant made of hydrocarbon is larger than that of the lubricant made of perfluoropolyether, a meniscus is further easily formed. However, it is desirable that lubricant is determined in consideration of other characteristics of lubricant, for example wear resistance, thermic scatter, corrosiveness and decomposition performance.

Fifth Embodiment

Figure 10:
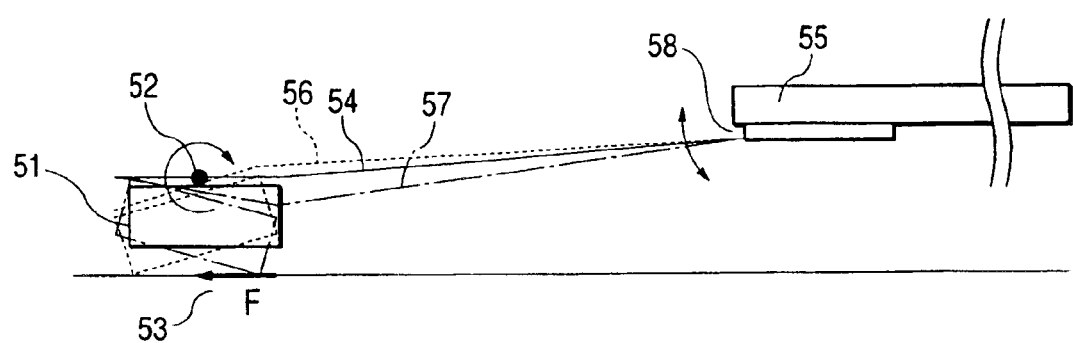
FIG. 10 is a schematic drawing showing a suspension according to the prior art.
Figure 11:
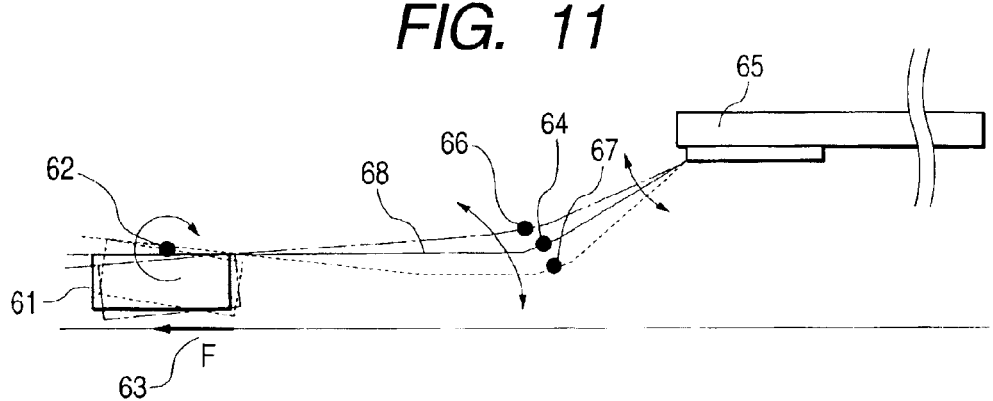
FIG. 11 is a schematic drawing showing a suspension equivalent to an embodiment of the invention.

For a slider suspension suitable for the head slider according to the invention, a head suspension which is provided with one deformable part between a rotation supporting mechanism of a slider supporting part and a suspension bending part in the vicinity of a suspension arm and in which the stiffness coefficient in a direction of the slider of the deformable part is smaller than the total rotational stiffness coefficient in a direction of pitch of the slider of the rotation supporting part and a suspension stiff part on the side of the slider is formed, and a head slider assembly is formed by combining the head suspension with the head slider according to the invention. Referring to FIGS. 10 and 11, the action of the slider suspension according to the invention will be described below.

FIG. 10 schematically shows a slider suspension 54 which has normally used. A head slider 51 is attached to the slider suspension 54 between a rotation supporting mechanism 52 of a slider supporting part and a suspension arm 55. When the slider comes in contact with a magnetic disk and friction force F 53 acts, the slider and the suspension are vibrated and deformed. In the case of the conventional type suspension shown in FIG. 10, the slider and the suspension are deformed by the rotation supporting mechanism 52 and a deformed part 58 of an arm mounting part. The suspension is deformed by the vibration of the slider as shown by reference numbers 56 and 57, however, as the quantity of deformation in a direction of friction force is small, the vibration of a head is not absorbed and lasts.

In the meantime, in an embodiment of a slider suspension 64 according to the invention shown in FIG. 11, the vibration of a head is absorbed in the movement of the suspension and does not last. The action and the effect will be described below. A head slider 61 is attached to a slider suspension 68 provided with one deformable part 64 between a rotation supporting mechanism 62 of a slider supporting part and a suspension arm 65. When the slider comes in contact with a magnetic disk and friction force F 63 acts, the slider and the suspension are vibrated and deformed. The deformable part 64 of the suspension is deformed by the vibration of a head and the rotation supporting mechanism 62 at the end of the suspension as shown by reference numbers 66 and 67. As the stiffness of the deformable part 64 of the suspension when it is deformed 66 in a direction of friction force by the action on the slider of friction force is smaller than the stiffness when the slider and a suspension solid part connected to the slider are deformed forward, the slider is moved in parallel in the direction of friction force without pitching and the vibration of the rotation supporting mechanism of the head can be absorbed.

That is, in this case, the stiffness coefficient in the direction of the slider of the deformable part is smaller than the total rotational stiffness coefficient in the direction of pitch of the slider of the rotation supporting mechanism and the suspension stiff part on the side of the slider and the vibration of the rotation supporting mechanism of the head can be absorbed. A suspension shown in FIG. 12 can also acquire the same effect.

In this case, a deformable part 74 easily deformed in a translational direction is provided in the center of an arm mounting part 75 of a suspension 76 and a slider rotation supporting mechanism 72 and as the translational stiffness of the deformable part is smaller than the rotational stiffness of a slider, the vibration of the slider can be absorbed and has the same action as the suspension shown in FIG. 11.

The slider according to the invention provided with the magnetic head is attached to each suspension described in this embodiment to be a slider suspension assembly and the slider suspension assembly is mounted in a magnetic disk apparatus.

Sixth Embodiment

Figure 12:
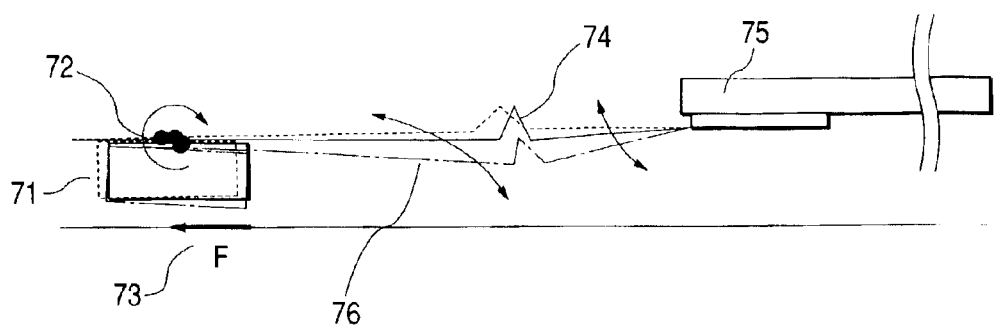
FIG. 12 is a schematic drawing showing a suspension equivalent to another embodiment of the invention.

The head sliders equivalent to the embodiments of the invention and shown in FIGS. 5, 6, 7 and 9 are used in a burnishing process, a glide inspection process and an error check process of a magnetic disk. In this case, as the vibration of the slider is small even if the magnetic disk and the slider come in contact, the magnetic disk can be burnished and inspected without being damaged. Further, if the slider suspension assemblies equivalent to the embodiment of the invention and shown in FIGS. 11 and 12 are used, the effect is surer.

As precise inspection without damaging a magnetic disk is enabled by executing burnishing, glide inspection and an error check according to the invention even if the flying height of a head is reduced up to 10 nm or less, a magnetic disk apparatus in which the magnetic disk is built hardly causes an error in operation, does not further require so much time for assembly and time for the inspection of assembly can be reduced.

If the head slider according to the invention is used for a clock head used in a servo track recording process in a process for assembling the magnetic disk apparatus, the magnetic disk is hardly damaged even if the magnetic disk and the slider come in contact and as the vibration of the slider is small, the deterioration of the reliability in the operation of the apparatus is reduced.

For a method of reducing the temporal decrease of lubricant on the magnetic disk, the decrease of lubricant can be reduced by arranging the same type of lubricant as that used for the magnetic disk in the magnetic disk apparatus, vaporizing it and supplying it to the magnetic disk. Therefore, it is desirable that lubricant arranged in the magnetic disk apparatus has small molecular weight.

Seventh Embodiment

Figure 13:
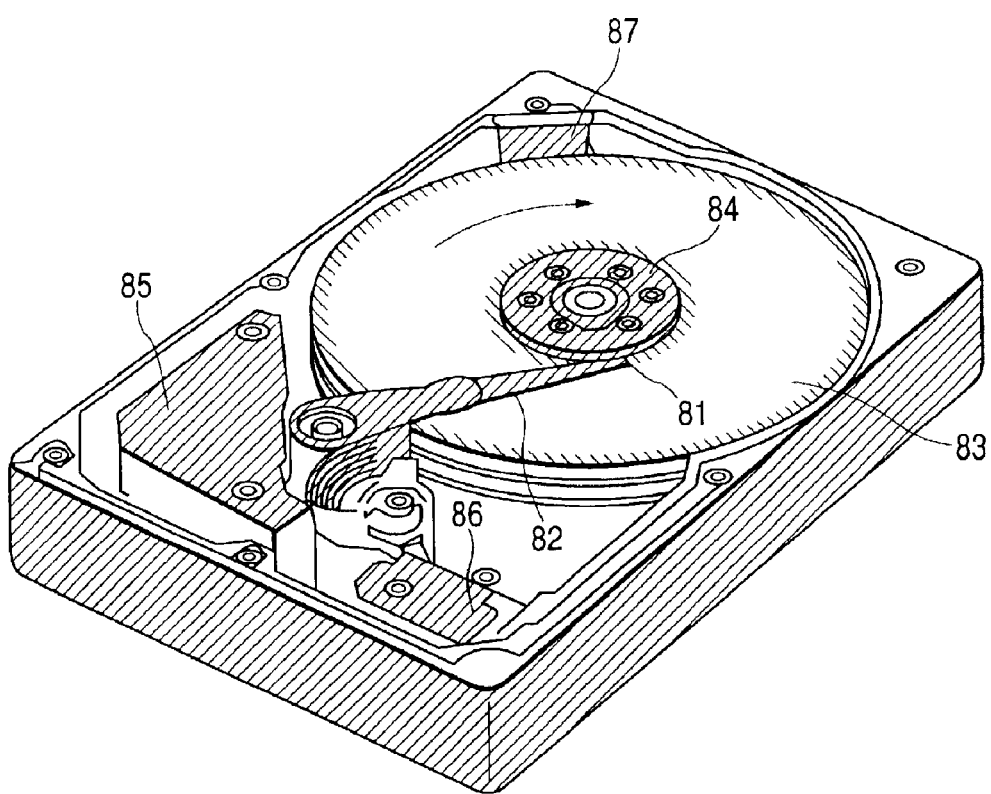
FIG. 13 is a schematic drawing showing a magnetic disk apparatus equivalent to an embodiment of the invention.

An embodiment of the invention will be further detailedly described below. FIG. 13 is a schematic perspective view showing a magnetic disk apparatus in which the head slider and the suspension respectively according to the invention are mounted.

The magnetic disk apparatus is composed of a magnetic head slider 81 on which a read/write element is mounted, a suspension 82, a magnetic disk 83, a spindle motor 84, a voice coil motor 85, a signal processing circuit 86 and a dust removal filter 87. The magnetic head slider 81 floats or continuously glides over the magnetic disk because the magnetic disk 83 is rotated. To make the magnetic head slider stably float or glide over the magnetic disk, a bearing surface is formed on the surface of the slider as described above.

Referring to FIG. 5, the seventh embodiment of the head slider according to the invention mounted in the magnetic disk apparatus will be further detailedly described below. For the material of the slider, alumina titanium carbide is used in this embodiment and the size of the slider is 1.25×1.0 mm. The size of the bearing surface 14 on the trailing side is 200 (length)×300 $\mu$m (width) (the width is shown by the reference number 19), for the bearing surfaces 11 on the leading side, each one is arranged on the left and on the right and for the size, the length is 300 $\mu$m, the wider width is 400 $\mu$m and the narrower width is 200 $\mu$m. After a predetermined etching mask is formed, a deep trench 15 is etched so that it is approximately 2 $\mu$m deep, shallow trenches 12 and 13 are etched so that they are 0.2 $\mu$m deep respectively by ion etching and the etching mask is removed. A load of a head is approximately 30 mN. The read/write element is arranged in a position off the trailing edge of the trailing bearing surface by 30 $\mu$m. After the shape of the slider is manufactured as described above, a silicon film is formed overall by sputtering so that the film has the thickness of 2 nm and a carbon film is formed on it by CVD so that the film has the thickness of 5 nm. The height of a crown of the slider is acquired based upon its curvature by approximating the whole slider to a circular cylinder. As a result, the height of the crown is approximately −2 to 8 nm. In the case of this head slider, the flying height at the peripheral speed of 7 m/s is approximately 15 nm. In this embodiment, carbon films having few types of thickness between 20 to 500 nm are formed up to a position off the leading edge by 200 $\mu$m and up to 100 $\mu$m on the leading bearing surface and as a result, difference-in-stage is formed.

Eighth Embodiment

For an eighth embodiment, samples the width of the bearing surface (also called the width of a pad) of which is varied in a range of 50 to 350 $\mu$m are manufactured. As the flying height of a head also varies when the width is varied, a leading bearing surface at the leading edge of a slider is provided from the leading edge, no step having a shallow trench is provided and the slider that does not float, that is, continuously glides in a state in which the slider is in contact with a magnetic disk is formed. For comparison 1, a head slider in which no difference-in-stage is formed is prepared. Difference-in-stage is measured under measuring conditions that it is measured in a tapping mode using a scanning probe microscope Nanoscope III™ manufactured by Digital Instrument, scanning size is 30×30 μm, a scanning rate is 1 Hz, the number of samples is 512, Z-limit is 440 V, filtering is executed by flattening, a cantilever is made of monocrystalline silicon and a radius of the curvature of the end is 5 to 20 nm. The result will be described later. The difference-in-stage is measured several times and an average value is regarded as the result of the measurement.

Figure 14:
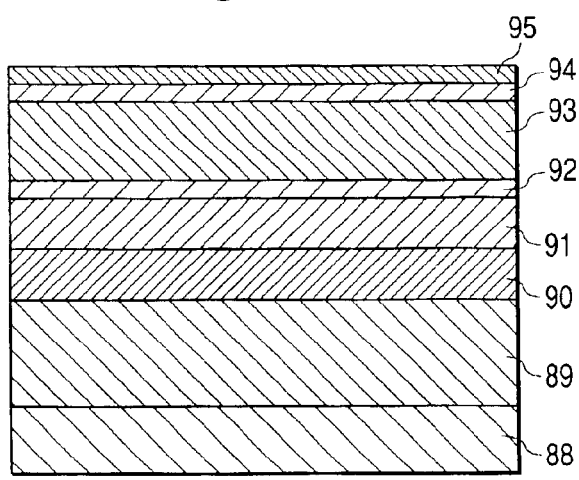
FIG. 14 is a schematic drawing showing the sectional structure of a magnetic disk equivalent to an embodiment of the invention.

FIG. 14 is a schematic drawing showing the sectional structure of a magnetic disk used for examining the characteristics of the head slider.

The magnetic disk is formed by forming a shielding layer 89 by an Ni—Ta alloy by 30 nm, forming an underlayer 90 on it by a Cr—Ti alloy by 5 nm, forming a film made of a Co—Cr—Pt alloy on it as a lower magnetic layer 91, forming an intermediate layer 92 made of Ru on it, forming a magnetic layer made of a Co—Cr—PtB alloy on it as an upper magnetic layer 93 and forming a carbon layer 94 like a diamond on it by 3.5 nm after a tempered glass substrate 88 made of aluminosilicate is cleaned. The layers up to the magnetic layer are formed by sputtering and the carbon layer like a diamond is formed by ion beam deposition. A lubricant layer is formed on the surface of a protective layer by liquid lubricant 95 according to dip coating. For lubricant, Fomblin Z-DOL manufactured by Ausimont is used. The molecular weight is approximately 3000. The thickness measured by FTIR of the lubricant layer is approximately 2.0 nm. The surface roughness of the magnetic disk is controlled by changing the surface roughness of the glass substrate. In this embodiment, substrates the surface roughness of which is 0.3 to 1.7 nm (Ra) and 3.0 to 14.0 nm (Rp) are prepared. Ra and Rp respectively mean arithmetic averaged roughness and distance between a crown line and an average line in JISB0601-1994. The roughness of the substrates is measured under measuring conditions that it is measured in a tapping mode using a scanning probe microscope Nanoscope III™ manufactured by Digital Instrument, scanning size is 10×10 μm, a scanning rate is 1 Hz, the number of samples is 512, Z-limit is 440 V, filtering is executed by flattening and a low-pass filter, a cantilever is made of monocrystalline silicon and a radius of the curvature of the end is 5 to 20 nm, and the result is shown. The surface roughness is measured several times and an average value is regarded as the result of the measurement.

In the invention, for a non-magnetic substrate of a magnetic disk, a glass substrate on the market for a magnetic disk is suitably used because the surface roughness is small, however, if the surface roughness can be reduced, another substrate may be also used.

Figure 15:
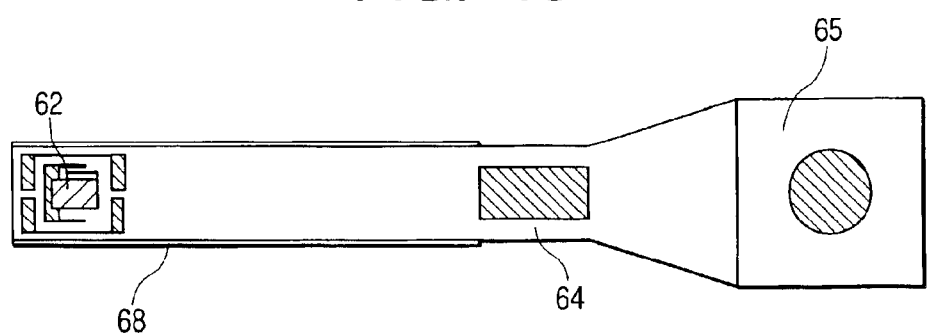
FIG. 15 is a schematic drawing showing a suspension equivalent to further another embodiment of the invention.

The suspension to which the head slider equivalent to the seventh embodiment is attached is normally used as a type 1930 shown in FIG. 10. The head slider equivalent to the eighth embodiment is shown in FIG. 15 and the load is set to 4 to 8 mN. This suspension is manufactured based upon the structural principle of the invention shown in FIG. 11 and is provided with the deformable part 64 having translational stiffness smaller than the rotational stiffness of the rotation supporting part at the back of the slider 62 in the center of the suspension.

Figure 16:
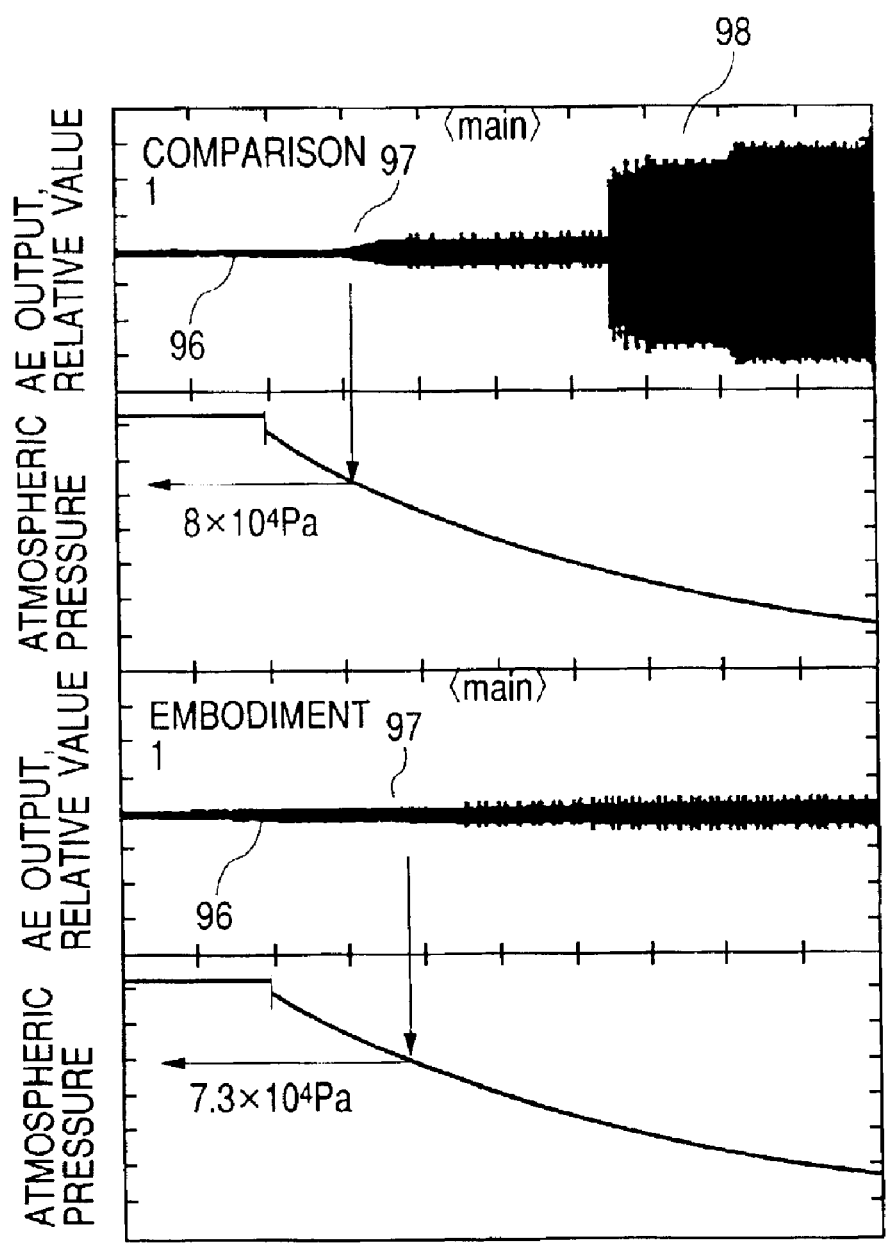
FIG. 16 compares reduced contact pressure AE signals in the eighth embodiment of the invention and comparison 1.

Atmospheric pressure is reduced up to 26600 Pa in a state in which the head sliders in the seventh embodiment and comparison 1 are floated over a magnetic disk having the roughness of 0.6 nm (Ra) at the peripheral speed of 7 m/s and the amplitude of friction force at that time and acoustic emission (AE) are measured. The amplitude of friction force increases as friction force increases and AE also increases. FIG. 16 shows relation between atmospheric pressure and the result of measured AE.

Upper two sections in FIG. 16 show the variation (AE is shown corresponding to the change of atmospheric pressure) of AE in comparison 1 when atmospheric pressure is reduced and lower two sections show that in case the difference-in-stage of 50 nm is provided to the bearing surface in the seventh embodiment. Under atmospheric pressure, there is little AE (a state of 96), however, when atmospheric pressure is reduced (rightward in FIG. 16), the slider starts to come in contact (a state of 97) in the case of comparison 1, when atmospheric pressure is further reduced, the slider is vibrated and extremely large AE (a state of 98) is measured. In the meantime, in the seventh embodiment using the slider according to the invention, even if atmospheric pressure is reduced, gigantic AE by the vibration of the slider is not measured.

Ninth Embodiment

Figure 17:
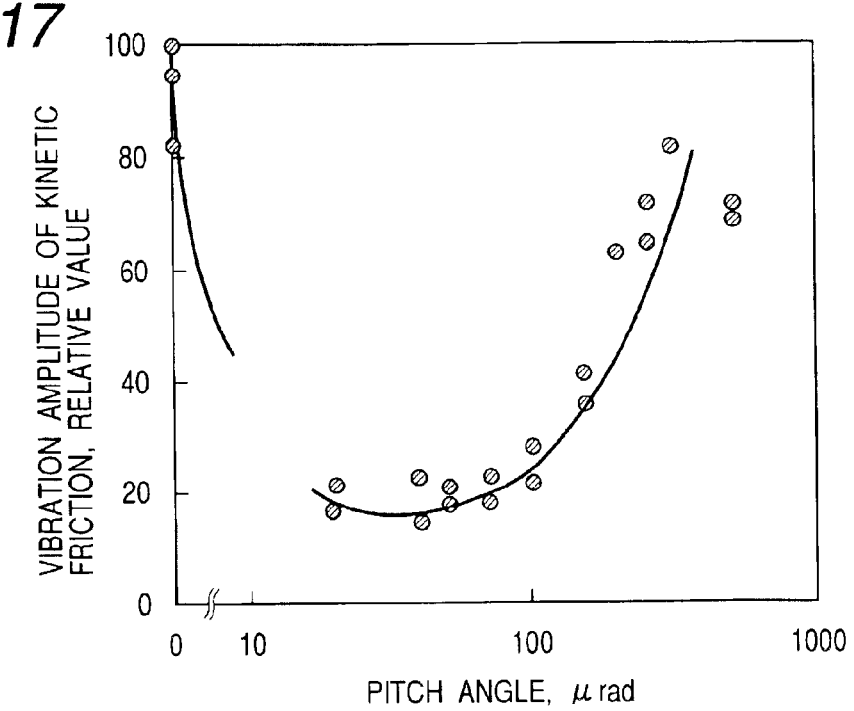
FIG. 17 shows relation between a pitch angle of a slider and the amplitude by vibration of friction force equivalent to a ninth embodiment of the invention.

Further, sliders in which the height of the difference-in-stage of the head slider equivalent to the seventh embodiment is varied and as a result, the pitch angle is varied are manufactured. These are attached to the similar head suspension to that in the seventh embodiment and the amplitude of friction force under the atmospheric pressure of 26600 Pa is compared. FIG. 17 shows the result.

In case the pitch angle is zero (that is, in comparison 1), the amplitude of friction force is large and the amplitude of friction force is rapidly reduced only by setting the pitch angle to 20 μrad or more. When the pitch angle is made larger so that it is 200 μrad or more, the amplitude of friction force becomes larger. It proves from the result that in a head using the slider equivalent to the seventh embodiment, the amplitude of friction force becomes extremely small by setting the pitch angle to 20 to 200 μrad.

Figure 18:
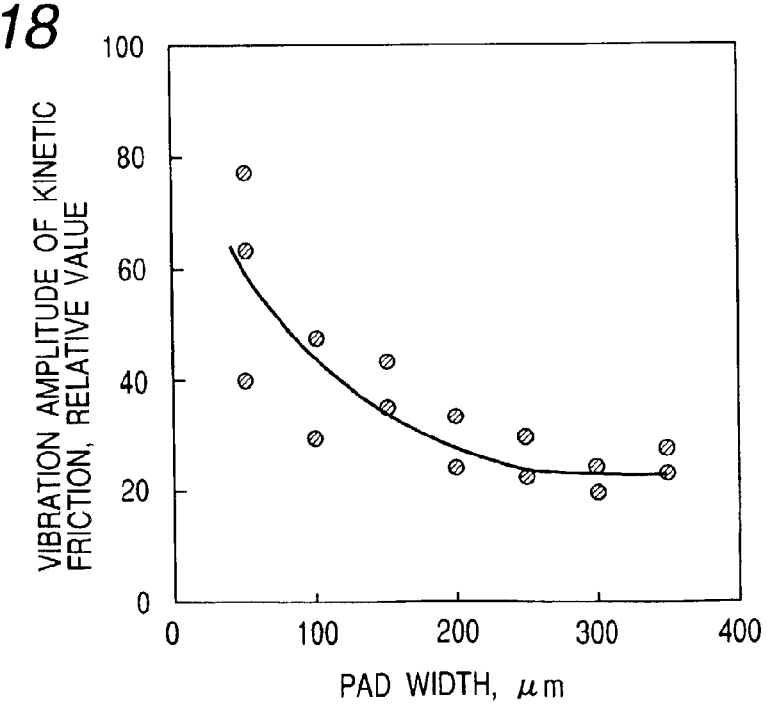
FIG. 18 shows relation between the pad width of the slider and the amplitude by vibration of friction force equivalent to the ninth embodiment of the invention.

The amplitude by vibration of friction force when the head is continuously glided over a magnetic disk having the surface roughness of 0.6 nm at the peripheral speed of 7 m/s is measured. FIG. 18 shows the result.

To surprise, to the contrary to a phenomenon that stiction is reduced when contact area is reduced, that is, pad width is reduced, which is suggested in the prior art, the result that when pad width is made larger, the amplitude by vibration of friction force becomes small is acquired.

Tenth Embodiment

Figure 19:
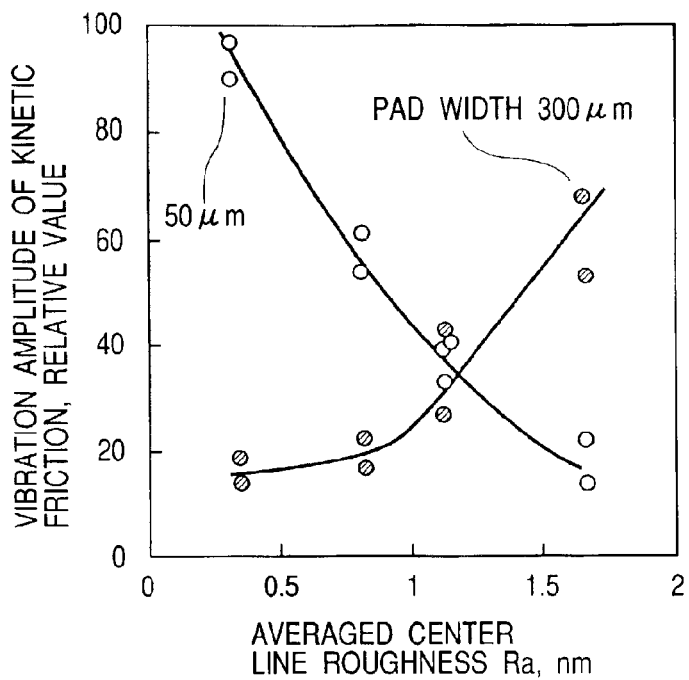
FIG. 19 shows relation between the surface roughness of a magnetic disk and the amplitude by vibration of friction force equivalent to a tenth embodiment of the invention.
Figure 20:
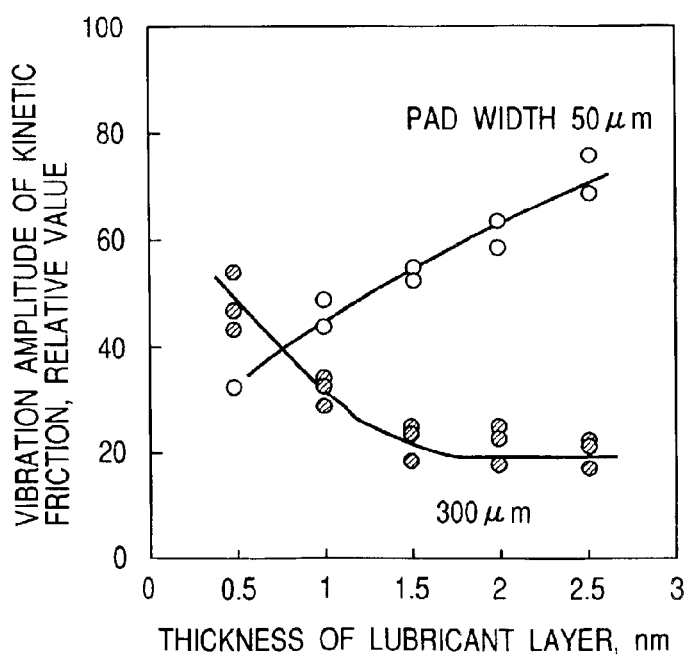
FIG. 20 shows relation between the thickness of a lubricant layer of the magnetic disk equivalent to the tenth embodiment of the invention and the amplitude by vibration of friction force.

Considering that the result shows a phenomenon different from that in the prior art, the amplitude by vibration of friction force is further compared in the combination of magnetic disks different in the thickness of a lubricant layer and surface roughness and the head slider equivalent to the seventh embodiment having the difference-in-stage that defines a pitch angle of 50 nm. FIG. 19 shows the result of the measurement of the magnetic disks the thickness of the respective lubricant layers of which is 0.5 nm, 1.0 nm, 1.5 nm, 2.0 nm and 2.5 nm and FIG. 20 shows the result of the measurement of the magnetic disks the averaged center line roughness Ra of which is respectively approximately 0.3 nm, 0.8 nm, 1.1 nm and 1.7 nm.

FIG. 19 showing dependency upon the thickness of the lubricant layer shows that in case pad width is large (300 μm), the thicker the lubricant layer is, the smaller the amplitude of friction force is, in case pad width is small (50 μm), the amplitude of friction force becomes large when the thickness of the lubricant layer is increased and the result becomes contrary depending upon pad width. As friction force is reduced when the thickness of the lubricant layer is 1.0 nm or more, it can be said that the magnetic disks having the thickness of the lubricant layer of 1.0 nm or more are suitable for combination with the head slider according to the invention. FIG. 20 showing dependency upon the surface roughness of the magnetic disks also shows a contrary result that in case pad width is large, friction force is reduced when the surface roughness is reduced and conversely, in case pad width is small, the smaller the surface roughness is, the larger friction force is. As friction force is reduced when the surface roughness of the magnetic disks is 1.3 nm (Ra) or less, it can be said that the magnetic disks having the roughness of 1.3 nm (Ra) or less are suitable for combination with the head slider according to the invention. It is considered that the phenomenon that the smaller contact area is, the smaller stiction is, which is suggested in the prior art shows the phenomenon caused in case pad width is small and shown in FIGS. 19 and 20 or is caused because the pitch angle of a slope in front of a contact point is not smaller than that in the rear and the compressive stress of lubricant is not enough. However, in case pad width is large, a new phenomenon that cannot be presumed in the prior art occurs. In view of these, we invented a thin film lubrication system in extremely low floating or contact glide that a head slider was lifted with the compressive stress of lubricant over a head-disk interface 1 to 3 nm thick by the bearing surface structure of the head sliders shown in FIGS. 1 to 4, that is, a mechanism for making the quantity of lubricant that accumulates in front of a contact point more than the quantity of lubricant that accumulates in the rear. In the invention, as it is determined whether a lubricant layer is formed or not in a contact point based upon relation between the compressive stress of the lubricant layer made at the contact point and a load of the slider that acts upon the contact point as presumed from the principle, the compressive stress of lubricant may be small if a load of a head is reduced and the width of the bearing surface may be reduced by the quantity. In this embodiment, when the width of the bearing surface of a slider the load of which is 4 to 35 mN is 200 μm or more, friction force decreases.

However, when the load is reduced, the similar effect can be acquired even if the width is small. In the prior art, as the load of the head slider, the surface roughness of the magnetic disk, the material of the lubricant layer, the thickness and the shape of the bearing surface of the slider are different from those in the invention, it is presumed that measurement was made as a phenomenon different from the invention.

Eleventh Embodiment

Figure 21:
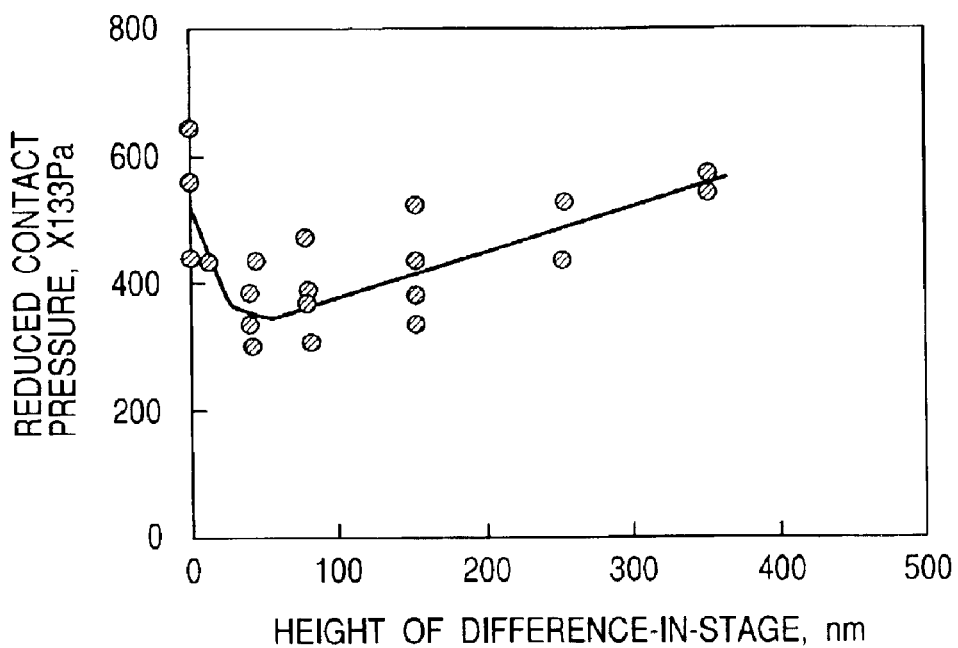
FIG. 21 shows relation between the height of difference-in-stage of a slider and reduced contact pressure equivalent to an eleventh embodiment of the invention.

Further, contact start atmospheric pressure at which it is determined based upon AE that contact with a magnetic disk is started when atmospheric pressure is reduced is measured using the height of the difference-in-stage on the bearing surface of the slider equivalent to the seventh embodiment as a parameter. The contact start atmospheric pressure is measured using a magnetic disk the thickness of the lubricant layer of which is 2.0 nm and Ra of which is 0.6 nm. FIG. 21 shows the result.

In case difference-in-stage is provided when a pitch angle is zero (that is, in the case of comparison 1) and a pitch angle is formed, contact start atmospheric pressure once decreases, has the minimum value when difference-in-stage of 50 to 100 nm is made and afterward, as the difference-in-stage is made higher, the contact start atmospheric pressure increases. As an AE signal shows the minute vibration of the head slider, it proves that the vibration of a head is evidently reduced by making difference-in-stage and when difference-in-stage is too large, the vibration of the slider becomes large. This phenomenon cannot be also suggested by the prior art and is a newly found phenomenon in the invention.

Twelfth Embodiment

Figure 22:
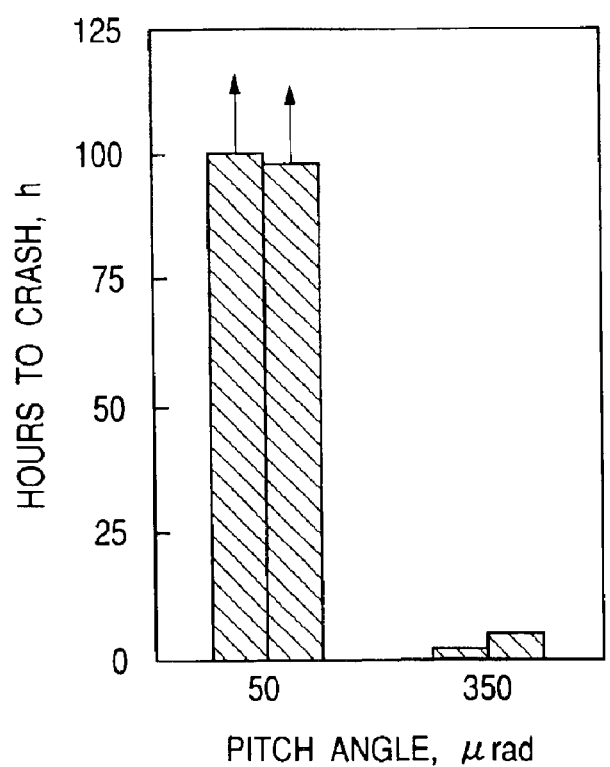
FIG. 22 shows relation between the height of difference-in-stage of a slider and wear resistance equivalent to a twelfth embodiment.

Next, the wear resistance of the head slider which is equivalent to the eighth-embodiment, the pad width of which is 300 μm and the height of respective difference-in-stage on the bearing surface of which is 50 nm and 350 nm is compared. In a wear resistance test, the head slider is continuously glided over a magnetic disk at the peripheral speed of 7 m/s and time till a crash is compared. In the thin film lubrication system according to the invention, when a pitch angle between the bearing surface of the slider and the magnetic disk is too large, the compressive stress of lubricant decreases, a lubricant layer cannot be formed on a contact interface and the wear resistance is deteriorated. FIG. 22 shows the result.

As clear from FIG. 22, when difference-in-stage is too large, that is, when a pitch angle is too large, time till a crash is short and it proves that the presumption of the inventors is right.

Thirteenth Embodiment

Figure 23:
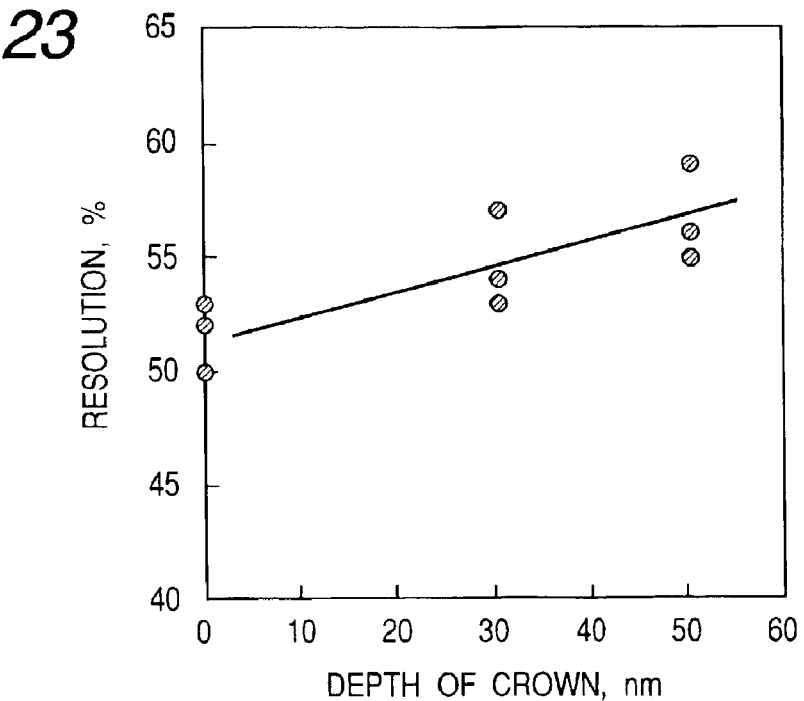
FIG. 23 shows relation between the height of a crown of a slider and resolution equivalent to a thirteenth embodiment of the invention.

Next, as a thirteenth embodiment, a slider which is based upon the head slider equivalent to the seventh embodiment, the height of difference-in-stage of which is 100 nm, the pad width of which is 300 μm, to the center of the back of which laser scribing is applied and which has a crown as a result is manufactured. The respective height of the prepared crowns is approximately 0 nm, approximately 30 nm and approximately 50 nm. The resolution of a magnetic disk is compared using a magnetic head using the head slider equivalent to the thirteenth embodiment. Resolution is related to distance between a read/write element and a magnetic layer of a magnetic disk and generally, when the distance is reduced, the resolution is enhanced. FIG. 23 shows the result. The result shows that when the crown is made large, the resolution is enhanced.

The results of examination in each embodiment described above show that in case the head slider or the slider suspension according to the invention is used, the effect of reducing friction force in high-speed contact and enhancing wear resistance is remarkable.

Fourteenth Embodiment

Further, as a fourteenth embodiment, a head slider in which texture different in a slope angle of a slope from the texture shown in FIG. 9 is formed on the bearing surface is proposed. The size of the bearing surface of the slider equivalent to the fourteenth embodiment is the same as that in comparison 1. For the texture, a shallow trench is 25 μm in width and is 6 nm deep, a contact part is 10 μm and a deep trench is 25 μm in width and is 50 nm deep. For comparison 2, the slider equivalent to the fourteenth embodiment having a deep trench 50 nm deep in place of the shallow texture trench of the bearing surface is manufactured. The amplitude of friction force under the atmospheric pressure of 26600 Pa in case the head slider equivalent to the fourteenth embodiment and the head slider in comparison 2 are combined with a magnetic disk which has a lubricant layer 2.0 nm thick and the averaged center line roughness Ra of which is 0.6 nm is compared. As a result, it is presumed that in the head slider in comparison 2, friction force is large and the slider is largely vibrated, however, in the head slider equivalent to the fourteenth embodiment, friction force is smaller enough than that in comparison 2.

In the fourteenth embodiment, the effect of the invention is embodied in texture structure in which the shallow trench and the deep trench are alternately arranged, however, for another method, a method of making a beam having directivity such as an ion beam incident on the bearing surface of the slider not vertically but diagonally and reducing a pitch angle of a slope in front is conceivable. For the shape of effective texture, in addition to linear texture perpendicular to the traveling direction of the slider (in the fourteenth embodiment), grid-like texture or texture having a honeycombed and polygonal pit is conceivable. In the case of the texture having a polygonal pit, as lubricant that accumulates in the polygonal pit effectively enters a contact part by making an angle of the slope of the pit larger than an angle of a slope in the rear of a slope in the traveling direction of the slider, the texture having the polygonal pit is effective to reduce friction force.

Fifteenth Embodiment

Figure 24:
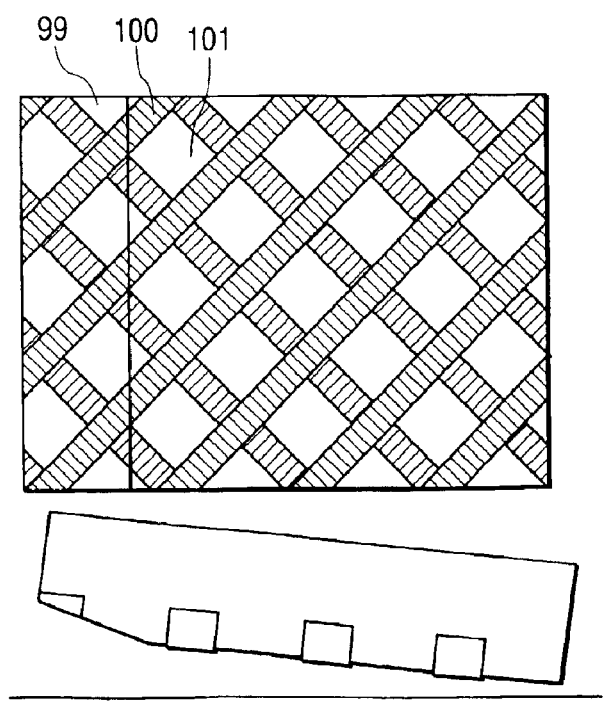
FIG. 24 is a schematic drawing showing the shape of a burnishing head in comparison 3.

As a fifteenth embodiment, an example that the head slider assembly equivalent to the eighth embodiment is used for the burnishing of a magnetic disk is shown. The height of difference-in-stage of the slider is 100 nm. For the magnetic disk, a magnetic disk which has a lubricant layer 1.5 to 2.0 nm thick and the averaged center line roughness Ra of which is 0.6 nm is used. The magnetic disk is sought in a range of 17 to 40.5 mm of the radius three times at the peripheral speed of 7 m/s and at the seek speed of 0.3 mm/rotation. For comparison 3, a magnetic disk which is burnished by a normal waffle-type burnishing head on the market is manufactured. FIG. 24 is a schematic drawing showing a burnishing head used for comparison 3.

The size of a slider is 2×1.6 mm, the load is 50 mN and the surface of the slider has a machined trench 100 crossed with a tapered part 99 and a floating surface 101. The condition of burnishing is the same. The magnetic disk equivalent to the fifteenth embodiment and the magnetic disk in comparison 3 are built in a magnetic disk apparatus and thermal asperity (TA) per one surface of the magnetic disk is compared. Thermal asperity means a phenomenon that a minute projection on the surface of a magnetic disk and a read/write element of a head come in contact and the output of a read signal is deformed and when the phenomenon is frequently caused, the ratio of the acceptance of the magnetic disk apparatus is deteriorated, thermal asperity initially unregistered is caused as the apparatus is operated and the reliability of the apparatus is deteriorated. For the result, the number of the thermal asperity of the magnetic disk equivalent to the fifteenth embodiment is 0.6 piece/surface on average, while in comparison 3, the number is 36 pieces/surface on average and the result that the magnetic disk to which burnishing in the fifteenth embodiment is applied is excellent in reliability is acquired.

Sixteenth Embodiment

In a sixteenth embodiment, glide inspection in which the head slider equivalent to the seventh embodiment is used for a glide inspection process of a magnetic disk is executed and a magnetic disk is screened. The pitch angle of the slider equivalent to the seventh embodiment is 100 $\mu$rad, a piezoelectric element is mounted at the back of the slider and a projection on the magnetic disk is inspected. The magnetic disk of the same type as that used in the fifteenth embodiment is used and after burnishing in comparison 3, glide inspection is executed. For comparison 4, a magnetic disk inspected using a normal glide inspection head of a two-rail type is also prepared. Each flying height of the slider equivalent to the sixteenth embodiment and the slider in comparison 4 is adjusted, adjusting peripheral speed so that it is respectively 6 nm and a projection defect is checked. In the inspection of respective one hundred (200 surfaces) magnetic disks in the sixteenth embodiment and in comparison 4, the number of projection defects of the magnetic disk equivalent to the sixteenth embodiment is 1.4 pieces/surface on average and that of the magnetic disk in comparison 4 is 9.2 pieces/surface on average. After the magnetic disk the number of projection defects of which is one or less out of them is built in a magnetic disk apparatus and errors and thermal asperity are registered, heat run is executed. In the heat run, the magnetic disk apparatus is made to perform predetermined operation under the environment of 60° C. and the occurrence of an error is monitored. For the number of errors caused in 200 hours, the magnetic disk equivalent to the sixth embodiment is 0, while an error (an error caused later) of 0.3 piece/surface on average occurs on the magnetic disk in comparison 4. The inventors think that as the magnetic disks are damaged in glide inspection in comparison 4, many projections are detected and in the magnetic disk apparatus, an error may be caused.

Seventeenth Embodiment

As a seventeenth embodiment, a case that the head slider equivalent to the seventh embodiment is used for a head for an error check will be described below. A checked magnetic disk is similar to the magnetic disk in the sixteenth embodiment. The head slider equivalent to the seventh embodiment in which the difference-in-stage of 50 nm is formed is used. As comparison 5, an error check is made using the head slider in comparison 1. The flying height of the head slider is 8 nm. The error check is made in a range of 18 to 40 mm of the radius with the pitch of 1 $\mu$m in both cases. Before the error check, burnishing in the fifteenth embodiment and glide inspection in the sixteenth embodiment are executed and the error check is made for respective one hundred magnetic disks in the seventeenth embodiment and in comparison 5. As a result of the error check, the average number of errors in the seventeenth embodiment is 12 pieces/surface and the average number of errors in comparison 5 is 38 pieces/surface.

Eighteenth Embodiment

Next, as an eighteenth embodiment, for a clock head used in a servo track recording process, a magnetic disk apparatus is assembled using the head slider equivalent to the seventh embodiment. For the clock head used in the eighteenth embodiment, the difference-in-stage in the seventh embodiment is set to 50 nm and the clock head used in the eighteenth embodiment is adjusted so that the flying height when. the rotational speed over a magnetic disk 3.0 inch in size is 5000 min$^{-1}$ is 8 nm. The clock head writes a clock signal in a position of 41 mm on the peripheral radius of the magnetic disk. In comparison 6, the head in comparison 1 without difference-in-stage is used. In the case of the eighteenth embodiment, a clock signal is normally written and the servo track recording process is finished without a problem. However, in the case of comparison 6, the read output of a clock signal varies and many magnetic disks do not normally finish the servo track recording process. When heat run is executed for the apparatuses as in the case of the sixteenth embodiment, the rate of occurrence of errors caused later is 11% in comparison 6, while in the eighteenth embodiment, it is 1% or less.

Nineteenth Embodiment

As a nineteenth embodiment, the head slider equivalent to the seventh embodiment and a magnetic disk which has a lubricant layer 2.0 nm thick made of Fomblin Z-DOL and the averaged center line roughness Ra of which is 0.6 nm are combined, and a magnetic disk apparatus having a dust filter 87 to which Fomblin Z-DOL having the average molecular weight of 2000 is applied by 1.5 mg is manufactured. As comparison 7, a magnetic disk apparatus having a dust filter to which no Fomblin Z-DOL is applied is manufactured. The difference-in-stage of the head slider used in the nineteenth embodiment is 50 nm and the flying height is 8 nm. The size of the magnetic disk is 2.5 inch and the average molecular weight of its lubricant layer is approximately 3000. The magnetic disk apparatus adopts a loading-unloading system. For comparison, a random seek test that the magnetic disk apparatus is repeatedly sought at random at 70° C. is made and time in which an error caused later occurs is checked. As a result, in the case of comparison 7, errors occur for 1200 hours, however, in the case of the nineteenth embodiment, no error occurs for 5000 hours or more. This shows that the reliable magnetic disk can be acquired by arranging lubricant which has the same structure as that in the magnetic disk in the nineteenth embodiment and has small average molecular weight inside the magnetic disk apparatus and combining it with the head slider according to the invention.

Twentieth Embodiment

Figure 25:
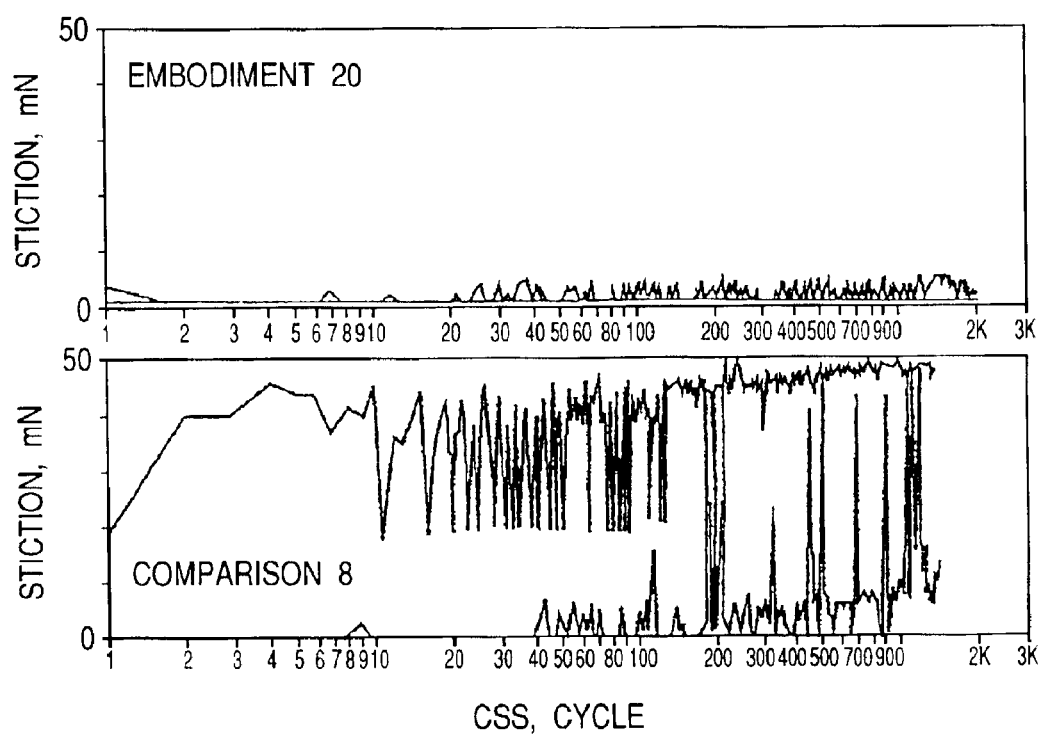
FIG. 25 shows the results of tests showing stiction in contact start-stop tests in a twentieth embodiment of the invention and comparison 8.

A twentieth embodiment shows that the reduction of stiction suggested in the prior art is also enabled in the invention. In the twentieth embodiment, a magnetic disk the averaged center line roughness Ra of which is 0.6 nm and which has a lubricant layer 2.2 nm thick is tested using the head slider equivalent to the eighth embodiment. In comparison 8, the slider equivalent to the eighth embodiment which has the difference-in-stage of 40 nm and the width of the bearing pad of which is 50 μm is used. The difference-in-stage of the slider equivalent to the twentieth embodiment is 40 nm. For the test, a contact start-stop test is made at the rotational speed of 4200 min$^{-1}$ for ten seconds in which a power source is turned on and next, for ten seconds in which it is turned off. FIG. 25 shows the result. In FIG. 25, the x-axis CSS, cycle shows the frequency of contact start-stop and the y-axis Stiction, mN shows stiction in the unit of mN.

In the slider in the twentieth embodiment, stiction is very small and in comparison 8, stiction is large. From the result, it proves that for the head slider according to the invention, not only friction force when the head slider comes in contact at high speed is reduced but stiction is reduced. It is suggested in the prior art that in the head slider in comparison 8, stiction is small, however, in this comparison test, stiction is not reduced and the head slider according to the invention shows the satisfactory effect of reducing stiction.

As described in each embodiment, friction force in high-speed contact can be reduced and wear resistance can be enhanced by manufacturing the magnetic disk apparatus using the head slider and the head slider assembly according to the invention.

What is claimed is:

1. A magnetic disk device comprising:

a magnetic disk; and a magnetic head slider provided with a plurality of air bearing surfaces for floating over the magnetic disk when the magnetic disk is rotated, and a loading point that receives a load onto the rotating magnetic disk, wherein the slider occasionally comes into contact with the magnetic disk, wherein a leading slope angle of one of the plurality of air bearing surfaces in front of the loading point in the traveling direction of the slider from an end closest to the magnetic disk with the surface of the magnetic disk is smaller than a trailing slope angle from the closest end with the surface of the magnetic disk, wherein at least two of said plurality of air bearing surfaces are not located on the same plane, wherein a difference-in-stage is formed on said one of the plurality of air bearing surfaces in the vicinity of a leading edge located in front of said loading point in the traveling direction of the slider, wherein said leading slope angle determined by the difference-in-stage with the surface of the magnetic disk is 20 to 150 μrad, and wherein at least a part of the width in lateral direction for the traveling direction of the head slider of the difference-in-stage on each bearing surface the 150 μm or more.

2. A magnetic disk device according to claim 1, further comprising:

a head suspension based upon a slider suspension for attaching the magnetic head slider and wherein one deformable part is provided between a rotation supporting mechanism of a slider supporting part and a suspension bending part in the vicinity of a suspension arm and the stiffness coefficient in the traveling direction of the slider of the deformable part is smaller than the total rotational stiffness coefficient in a direction of pitch of the slider of the rotation supporting mechanism and a suspension stiff part on the side of the slider.

3. A magnetic disk device according to claim 1, wherein between said magnetic disk and said plurality of air bearing surfaces a lubricant is provided.

4. A magnetic disk device according to claim 1, wherein an averaged center line roughness of said magnetic disk is 1.3 nm or less.

5. A magnetic disk device comprising:

a magnetic disk; and a magnetic head slider provided with a plurality of air bearing surfaces for floating over a magnetic disk surface when the magnetic disk is rotated, and a loading point that receives a load onto the rotating magnetic disk, wherein the slider occasionally comes into contact with the magnetic disk surface, wherein a slope angle in the traveling direction of the head slider of one of said plurality of air beaing surfaces determined by difference-in-stage formed on said one of said plurality of air bearing surfaces in the vicinity of an air leading edge located in front of said loading point in the traveling direction of the slider with the surface of a magnetic disk is larger than a slope angle in the traveling direction of the head slider determined by another one of said plurality of air bearing surfaces in the vicinity of an air trailing edge located in the rear of the loading point and the surface of the magnetic disk, and at least a part of the width in a lateral direction of the traveling direction of the head slider of the difference-in-stage on each bearing surface is 150 μm or more.

6. A magnetic disk device according to claim 5, wherein an averaged center line roughness of said magnetic disk is 1.3 nm or less.

7. A magnetic disk divece comprising:

a magnetic disk; and a magnetic head slider provided with a plurality of air bearing surfaces for floating over a magnetic disk surface when the magnetic disk is rotated, and a loading print that receives a load onto the rotating magnetic disk, wherein the slider occasionally comes into contact with the magnetic disk surface, wherein a leading slope angle of one of the plurality of air bearing surfaces in front of the loading point in the traveling direction of the slider from an end closest to the magnetic disk platter with the surface of the magnetic disk is smaller than a trailing slope angle from the closest end with the surface of the magnetic disk, wherein said one of said plurality of air bearing surfaces forms a convex on the side of said magnetic disk surface in the vicinity of the center in the longitudinal direction of the slider, wherein a slope angle determined by a difference-in-stage on said one of said plurality of air bearing surfaces in the vicinity of an air trailing edge and the surface of the magnetic disk is 20 to 100 μrad, and at least a part of the width in a lateral direction for the traveling direction of the head slider of the difference-in-stage on each bearing surface is 150 μm or more.

8. A magnetic disk device according to claim 7, wherein an averaged center line roughness of said magnetic disk is 1.3 nm or less.

9. A magnetic disk device comprising:

a magnetic disk; and a magnetic head slider provided with a plurality of air bearing surfaces for floating over said magnetic disk, wherein the slider occasionally comes into contact with the magnetic disk platter, wherein said plurality of air bearing surfaces are located on the same plane, and each air bearing surface is provided with a trench formed in a direction perpendicular to the traveling direction of both the slider and the magnetic disk surface, each trench is formed as a trench having a slope angle relative to the magnetic disk platter, said trenches which have a relatively small slope angle are arranged in a front portion of the corresponding air bearing surface, and said trenches which have a relatively large slope angle are arranged in a rear portion of the corresponding air bearing surface, and at least a part of the width in a lateral direction in the traveling direction of the head slider of each trench is 150 μm or more.

10. A magnetic disk device according to claim 9, wherein an averaged center line roughness of said magnetic disk is 1.3 nm or less.

* * * * *

UNITED STATES PATENT AND TRADEMARK OFFICE
CERTIFICATE OF CORRECTION

PATENT NO. : 6,927,942 B2
DATED : August 9, 2005
INVENTOR(S) : Tani et al.

It is certified that error appears in the above-identified patent and that said Letters Patent is hereby corrected as shown below:

<u>Title page,</u>
Item [73], Assignee, please correct to read as follows:
-- [73] Hitachi Global Storage Technologies Japan, Ltd., Odawara (JP) --.

Signed and Sealed this

Twenty-ninth Day of November, 2005

JON W. DUDAS
*Director of the United States Patent and Trademark Office*